US012707334B2

(12) United States Patent
Geng et al.

(10) Patent No.: US 12,707,334 B2
(45) Date of Patent: Aug. 11, 2026

(54) METHOD AND APPARATUS FOR COMMUNICATION MANAGEMENT

(71) Applicant: Telefonaktiebolaget LM Ericsson (publ), Stockholm (SE)

(72) Inventors: Yi Geng, Nanjing Jiangsu (CN); Xingqin Lin, San José, CA (US); Sebastian Euler, Storvreta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 441 days.

(21) Appl. No.: 18/031,752

(22) PCT Filed: Oct. 14, 2020

(86) PCT No.: PCT/CN2020/120901

§ 371 (c)(1),
(2) Date: Apr. 13, 2023

(87) PCT Pub. No.: WO2022/077267

PCT Pub. Date: Apr. 21, 2022

(65) Prior Publication Data

US 2023/0388889 A1 Nov. 30, 2023

(51) Int. Cl.
*H04W 28/16* (2009.01)
*H04W 36/32* (2009.01)

(52) U.S. Cl.
CPC ......... *H04W 28/16* (2013.01); *H04W 36/328* (2023.05)

(58) Field of Classification Search
CPC ............................ H04W 28/16; H04W 36/328
See application file for complete search history.

(56) References Cited

U.S. PATENT DOCUMENTS 10,791,561 B2 9/2020 Raghavan et al.
2007/0042773 A1 2/2007 Alcorn
2008/0096542 A1 4/2008 Chu et al.
(Continued)

FOREIGN PATENT DOCUMENTS

CN 101489303 A 7/2009
CN 102958115 A 3/2013
(Continued)

*Primary Examiner* — Blake J Rubin
(74) *Attorney, Agent, or Firm* — Murphy, Bilak & Homiller, PLLC

(57) ABSTRACT

Various embodiments of the present disclosure provide method and apparatus for communication management. A method performed by a communication management node may comprise: obtaining (S101) arrangement information about at least one pair of cells in a communication system; wherein a pair of cells of the at least one pair of cells comprises a serving cell with a first coverage range, and an assistant cell with a second coverage range; wherein the first coverage range at least partially overlaps with the second coverage range; and transmitting (S102) a configuration to a network node providing the serving cell; wherein the configuration indicates the network node to determine whether a terminal device is in an overlapped coverage range of the serving cell and the assistant cell, and indicates the net-sun work node to use the serving cell to serve the terminal device. The desired serving cell/beam may be used to serve the terminal device.

20 Claims, 33 Drawing Sheets

(56) References Cited

U.S. PATENT DOCUMENTS

2015/0236778 A1* 8/2015 Jalali .................. H04W 36/304 370/316
2016/0380692 A1* 12/2016 Jalali .................. H04W 16/28 455/11.1
2018/0019516 A1* 1/2018 Teague ............... H04B 7/18504
2018/0324662 A1* 11/2018 Phuyal ................. H04W 48/16
2019/0045406 A1* 2/2019 Kalathil ........... H04W 36/0094
2019/0182730 A1* 6/2019 Yeh ...................... H04W 24/10
2019/0306675 A1* 10/2019 Xue ....................... H04W 4/40
2019/0306768 A1* 10/2019 Kim ................... H04W 36/302
2019/0369201 A1 12/2019 Akkarakaran et al.
2020/0037219 A1 1/2020 Kumar et al.
2020/0236573 A1* 7/2020 Zhang .................. H04W 76/27
2020/0266903 A1* 8/2020 De Rosa ........... H04B 7/18506
2020/0314906 A1* 10/2020 Goyal ................. H04B 7/0695
2020/0413267 A1* 12/2020 Xue ..................... H04W 24/08
2021/0058967 A1* 2/2021 Oteri .................... H04W 72/23
2021/0159971 A1* 5/2021 Panchal ................ G05D 1/101
2021/0185568 A1* 6/2021 Chang ................ H04W 36/328
2021/0258909 A1* 8/2021 Rydén .................. H04W 72/51
2022/0069876 A1* 3/2022 Xue .................. H04B 7/18504
2022/0077896 A1* 3/2022 Jung ...................... H04B 7/024
2022/0158702 A1* 5/2022 Nallampatti Ekambaram ........... H04B 7/0617
2023/0155764 A1* 5/2023 Sheng ................. H04B 7/0413 370/329
2023/0275944 A1* 8/2023 Slater ................... H04L 67/563 709/231

FOREIGN PATENT DOCUMENTS

CN 104284437 A 1/2015
CN 104579608 A 4/2015
CN 104584622 A 4/2015
CN 103200665 B 3/2016
CN 110740499 A 1/2020

* cited by examiner

Figures 7, 8A:
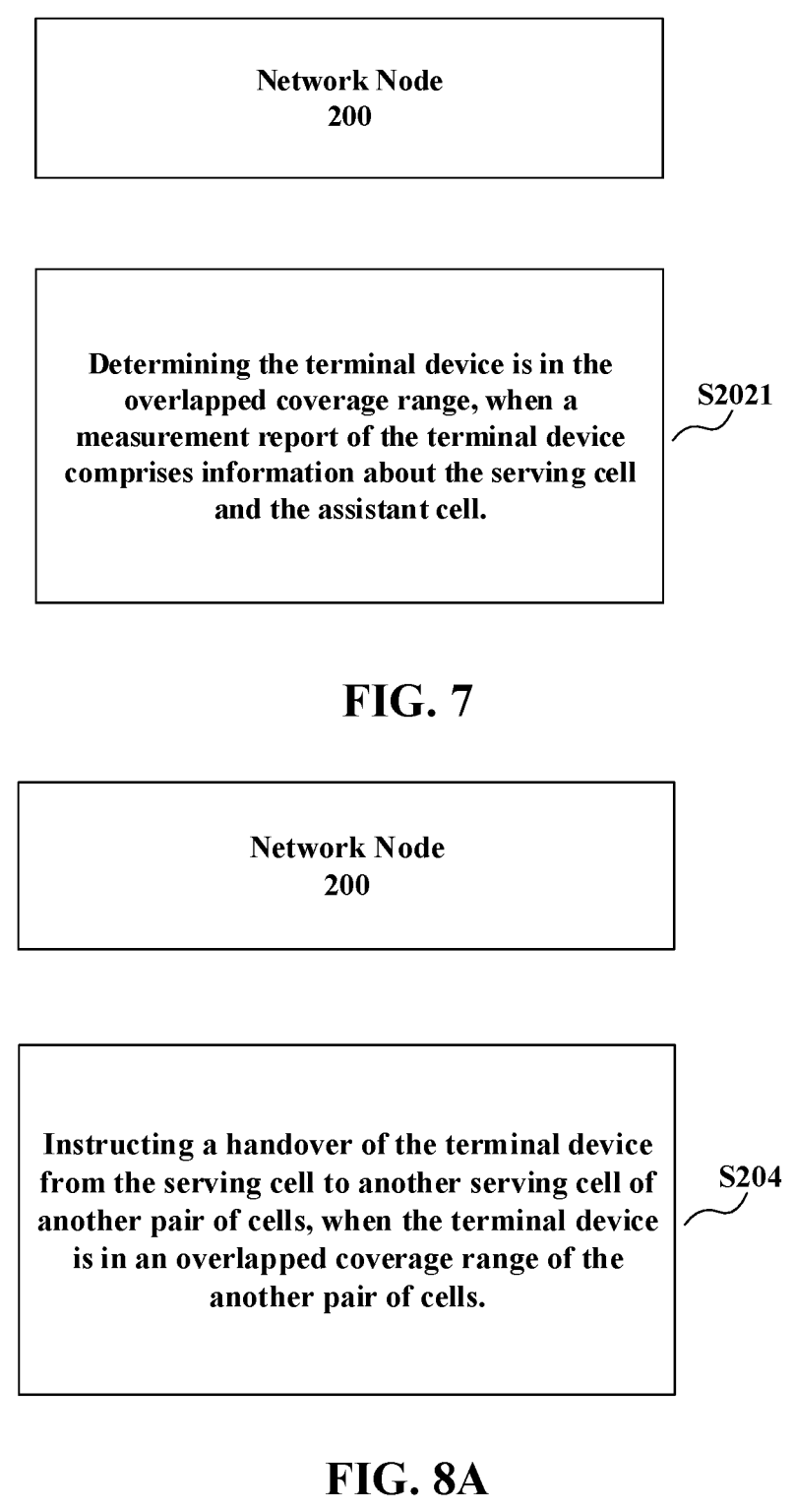

Network Node
200

Determining the terminal device is in the overlapped coverage range, when a measurement report of the terminal device comprises information about the serving cell and the assistant cell.

Network Node
200

Instructing a handover of the terminal device from the serving cell to another serving cell of another pair of cells, when the terminal device is in an overlapped coverage range of the another pair of cells.

Determining whether a signal quality of the another serving cell is better than a signal quality of the serving cell

S205

Instructing the handover of the terminal device from the serving cell to the another serving cell, in response to that the signal quality of the another serving cell is better

S206

METHOD AND APPARATUS FOR COMMUNICATION MANAGEMENT

FIELD OF THE INVENTION

The present disclosure generally relates to communication networks, and more specifically, to a method and an apparatus for communication management.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless/mobile communication system, a plurality of network node with antennas may provide radio beams to cover certain spatial regions. One certain spatial region may be a cell. It is usually desired that a terminal device in a certain region uses an associated beam/cell to communicate with the associated network node.

However, a main lobe of the associated beam/cell to cover the region may still have certain power level even outside the region, or the associated beam may generate unavoidable side lobe outside the region, or different beams may have the same coverage range, thus the network node and the terminal device cannot know whether a serving beam/cell for a terminal device is the desired/planned one for the position of the terminal device.

If a terminal device cannot use a desired/planed beam/cell while at a certain position, the communication quality may be unstable, and unpredictable.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Improved methods and apparatuses for communication management between a network node and a terminal device may be provided. Particularly, it is capable for a network node to identify whether a terminal device is in desired/planned position range, and use a certain cell to serve the terminal device accordingly.

According to a first aspect of the present disclosure, there is provided a method performed by a communication management node, comprising: obtaining arrangement information about at least one pair of cells in a communication system; wherein a pair of cells of the at least one pair of cells comprises a serving cell with a first coverage range, and an assistant cell with a second coverage range; wherein the first coverage range at least partially overlaps with the second coverage range; and transmitting a configuration to a network node providing the serving cell; wherein the configuration indicates the network node to determine whether a terminal device is in an overlapped coverage range of the serving cell and the assistant cell, and indicates the network node to use the serving cell to serve the terminal device.

In exemplary embodiments of the present disclosure, it is determined the terminal device is in the overlapped coverage range, when a measurement report of the terminal device comprises information about the serving cell and the assistant cell.

In exemplary embodiments of the present disclosure, a boresight direction of an antenna for the serving cell and a boresight direction of an antenna for the assistant cell are basically the same.

In exemplary embodiments of the present disclosure, the network node instructs a handover of the terminal device from the serving cell to another serving cell of another pair of cells, when the terminal device is in an overlapped coverage range of the another pair of cells.

In exemplary embodiments of the present disclosure, the handover is instructed, when a signal quality of the another serving cell is better than a signal quality of the serving cell.

In exemplary embodiments of the present disclosure, the network node comprises a base station.

In exemplary embodiments of the present disclosure, the terminal device is an aircraft.

In exemplary embodiments of the present disclosure, the serving cell and the assistant cell are provided by the same network node; or the serving cell and the assistant cell are provided by different network nodes.

According to a second aspect of the present disclosure, there is provided a method performed by a network node, comprising: providing a serving cell with a first coverage range; wherein the serving cell is included in a pair of cells; wherein the pair of cells further includes an assistant cell with a second coverage range; wherein the first coverage range at least partially overlaps with the second coverage range; determining whether a terminal device is in an overlapped coverage range of the serving cell and the assistant cell; and serving the terminal device with the serving cell, in response to the terminal device is in the overlapped coverage range.

In exemplary embodiments of the present disclosure, determining whether a terminal device is in an overlapped coverage range of the serving cell and the assistant cell comprises: determining the terminal device is in the overlapped coverage range, when a measurement report of the terminal device comprises information about the serving cell and the assistant cell.

In exemplary embodiments of the present disclosure, a boresight direction of an antenna for the serving cell and a boresight direction of an antenna for the assistant cell are basically the same.

In exemplary embodiments of the present disclosure, the method further comprises: instructing a handover of the terminal device from the serving cell to another serving cell of another pair of cells, when the terminal device is in an overlapped coverage range of the another pair of cells.

In exemplary embodiments of the present disclosure, the method further comprises: determining whether a signal quality of the another serving cell is better than a signal quality of the serving cell; and instructing the handover of the terminal device from the serving cell to the another serving cell, in response to that the signal quality of the another serving cell is better.

In exemplary embodiments of the present disclosure, the network node comprises a base station.

In exemplary embodiments of the present disclosure, the terminal device is an aircraft.

In exemplary embodiments of the present disclosure, the serving cell and the assistant cell are provided by the same network node; or the serving cell and the assistant cell are provided by different network nodes.

According to a third aspect of the present disclosure, there is provided a communication management node, comprising: a processor; and a memory, the memory containing instructions executable by the processor, whereby the communication management node is operative to: obtain arrangement information about at least one pair of cells in a communication system; wherein a pair of cells of the at least one pair of cells comprises a serving cell with a first coverage range, and an assistant cell with a second coverage range; wherein the first coverage range at least partially overlaps with the second coverage range; and transmit a configuration to a network node providing the serving cell; wherein the configuration indicates the network node to determine whether a terminal device is in an overlapped coverage range of the serving cell and the assistant cell, and indicates the network node to use the serving cell to serve the terminal device.

In exemplary embodiments of the present disclosure, the communication management node is further operative to perform the method according to any of embodiments described above.

According to a fourth aspect of the present disclosure, there is provided a network node, comprising: a processor; and a memory, the memory containing instructions executable by the processor, whereby the network node is operative to: provide a serving cell with a first coverage range; wherein the serving cell is included in a pair of cells; wherein the pair of cells further includes an assistant cell with a second coverage range; wherein the first coverage range at least partially overlaps with the second coverage range; determine whether a terminal device is in an overlapped coverage range of the serving cell and the assistant cell; and serve the terminal device with the serving cell, in response to the terminal device is in the overlapped coverage range.

In exemplary embodiments of the present disclosure, the network node is further operative to perform the method according to any of embodiments described above.

According to a fifth aspect of the present disclosure, there is provided a communication system, comprising the network node according to any of embodiments described above.

According to a sixth aspect of the present disclosure, there is provided a computer-readable storage medium storing instructions which when executed by at least one processor, cause the at least one processor to perform the method according to any of embodiments described above.

According to a seventh aspect of the present disclosure, there is provided a communication management node, comprising: an obtaining unit, configured to obtain arrangement information about at least one pair of cells in a communication system; wherein a pair of cells of the at least one pair of cells comprises a serving cell with a first coverage range, and an assistant cell with a second coverage range; wherein the first coverage range at least partially overlaps with the second coverage range; and a transmitting unit, configured to transmit a configuration to a network node providing the serving cell; wherein the configuration indicates the network node to determine whether a terminal device is in an overlapped coverage range of the serving cell and the assistant cell, and indicates the network node to use the serving cell to serve the terminal device.

According to an eighth aspect of the present disclosure, there is provided a network node, comprising: a providing unit, configured to provide a serving cell with a first coverage range; wherein the serving cell is included in a pair of cells; wherein the pair of cells further includes an assistant cell with a second coverage range; wherein the first coverage range at least partially overlaps with the second coverage range; a determining unit, configured to determine whether a terminal device is in an overlapped coverage range of the serving cell and the assistant cell; and a serving unit, configured to serve the terminal device using the serving cell.

Embodiments herein afford many advantages. For example, some embodiments herein may provide at least one pair of cells in a communication system. The network node may determine whether a terminal device is in an overlapped coverage range of the serving cell and the assistant cell in one pair of cells, and use the serving cell to serve the terminal device. Since the overlapped coverage range of two cells is more unique than one cell in the communication system, the position of the terminal device may be more exactly determined by the network node, and the desired serving cell/beam may be used to serve the terminal device. Thus, the communication quality may be better ensured. A person skilled in the art will recognize additional features and advantages upon reading the following detailed description.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 5 is a flowchart illustrating a method performed by a communication management node, according to an embodiment of the present disclosure.

FIG. 6 is a flowchart illustrating a method performed by a network node, according to an embodiment of the present disclosure.

FIG. 7 is a flowchart illustrating an additional step of the method in FIG. 6, according to an embodiment of the present disclosure.

FIG. 8A is a flowchart illustrating an additional step of the method in FIG. 6, according to an embodiment of the present disclosure.

DETAILED DESCRIPTION

Figure 1:
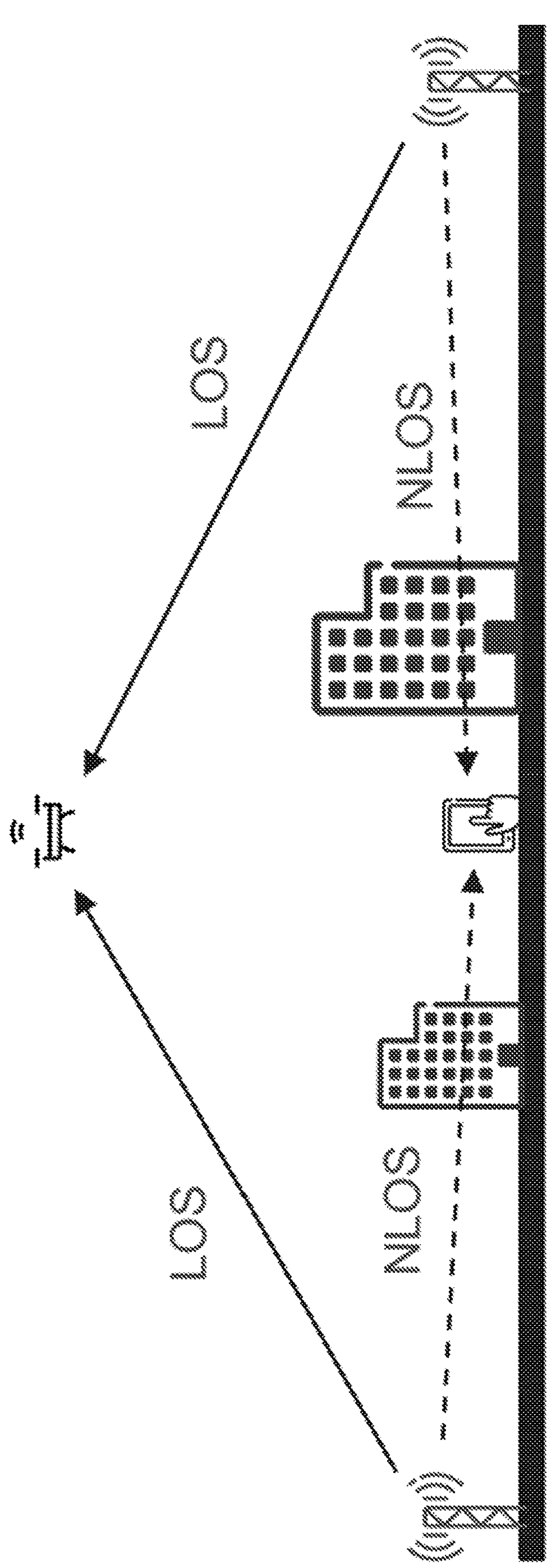
FIG. 1 schematically shows LOS/NLOS (non-LOS) propagation for aerial and ground-based devices.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", "communication network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3rd Generation Partnership Project (3GPP). For example, the communication protocols as may comprise the first generation (1G), 2G, 3G, 4G, 4.5G, 5G communication protocols, and/or any other protocols either currently known or to be developed in the future.

The term "network device/node" refers to a network node in a communication network via which a terminal device accesses to the network and receives services therefrom. The network device may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), an integrated access backhaul (IAB) node, a relay, a low power node such as a femto, a pico, and so forth.

Yet further examples of the network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, an unmanned aerial vehicle, an aerial user equipment, or other suitable devices. The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a UE may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another specific example, in an IoT scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3GPP context be referred to as a machine-type communication (MTC) device. In this scenario, a terminal device can be an aircraft connected to a controller via air interface.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, a downlink, DL, transmission refers to a transmission from a network device to a terminal device, and an uplink, UL, transmission refers to a transmission in an opposite direction.

As used herein, an aircraft refers to any machine supported for flight in the air by buoyancy or by the dynamic action of air on its surfaces. By way of example and not limitation, the aircraft may include, but not limited to, aerial vehicle such as Unmanned Aerial Vehicle (UAV), aerial UE, powered airplanes, gliders, helicopters, drones, balloons, and so forth.

As used herein, Unmanned Aircraft System (UAS) Traffic Management (UTM) system refers to a system which can provide various functions such as defining the rules of aircraft (such as drone) operation, addressing the safety issues for aircraft such as drone, etc. For example, the functions of the UTM may include mandating drone traffic management systems similar to the air traffic control systems of manned aviation. Aerial flight route may be planned by UTM. UTM can communicate with cellular networks by a northbound interface of operations support system (OSS).

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to LTE or NR network being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

As described above, it is desired to know whether a serving beam/cell for a terminal device is the desired/planned one for the position of the terminal device.

In some implementations, the network node currently serving the terminal device may try to obtain a position about the terminal device. For example, the terminal device may have a GPS (global positioning system) module, and may report the position to the network node. Alternatively, a TOF (Time of flight) of the radio signals between the network node and the terminal device may be utilized to calculate the position of the terminal device. However, such manners need extra hardware, software, and extra processing procedures. There will be extra cost and load for the terminal device to be equipped with such functions. Particularly, such procedures are time consuming, and thus not suitable for some terminal devices, such as those moving quickly.

An aircraft will be illustrated as a non-limiting example, but it should be understood the embodiments of the present disclosure is applicable for any other kind of terminal devices.

Connected sky is an indispensable part of the Internet of Things: Anywhere, Anytime, Anything. Cellular networks have the potential to provide wide-area, high-quality, and secure connectivity for aircraft. One example is low altitude unmanned aerial vehicles (UAVs, aka. drones), which have attracted much interest recently. They have many applications ranging from package delivery and surveillance to remote sensing and Internet of Things (IoT) scenarios. The safe operation of drones relies on reliable and seamless wireless connectivity.

Leveraging cellular networks to connect drones poses several challenges. Existing cellular infrastructure uses base stations (BSs) with down-tilted antennas to enhance terrestrial coverage. This means that the main lobe of an antenna beam faces towards the ground whereas the significantly weaker side lobes point in certain other directions. Moreover, there exist several null directions in a BS's antenna pattern that may cause coverage holes in the sky. In a network with multiple BSs, where a drone is connected to the BS that provides the maximum received signal power, the drone flying in the sky has to traverse a fragmented coverage pattern.

Below, a few main characteristics associated with using cellular networks to provide connectivity for low-altitude aircraft are summarized in more detail, such as LOS propagation, degraded KPIs (key performance indicator) caused by side lobes, and sudden drop in signal strength.

FIG. 1 schematically shows LOS/NLOS (non-LOS) propagation for aerial and ground-based devices.

Empirical measurements have shown that aerial radio channels exhibit different propagation characteristics compared to the terrestrial radio channels. One distinct feature of the aerial radio channels is the higher likelihood of line-of-sight (LOS) propagation due to the absence of obstacles in the sky as illustrated in FIG. 1.

Since the signal propagation in the sky is close to line-of-sight, the signal strength becomes stronger due to the reduced path loss. The stronger signal strength from the serving base station is desirable. The higher likelihood of line-of-sight propagation may lead to stronger received signal strengths. For example, the received signal strengths may be very strong even the drones are far away from the serving base station. This fact has been verified by field measurements in some 3$^{rd}$ generation partnership project technical reports, such as 3GPP TR 36.777, which shows that existing 4G macro BSs have the capability to provide coverage up to e.g., 6-8 km.

The drone, however, may have line-of-sight paths to many non-serving base stations in the area as well. Since the cells share the same radio resources, the increased likelihood of line-of-sight paths to many non-serving cells increases the interference for the drone. The high level of interference might cause a low signal-to-interference-plus-noise ratio (SINR), which might make it difficult for the drone UE to promptly receive and decode mobility management related messages (for example, handover commands).

Figure 2:
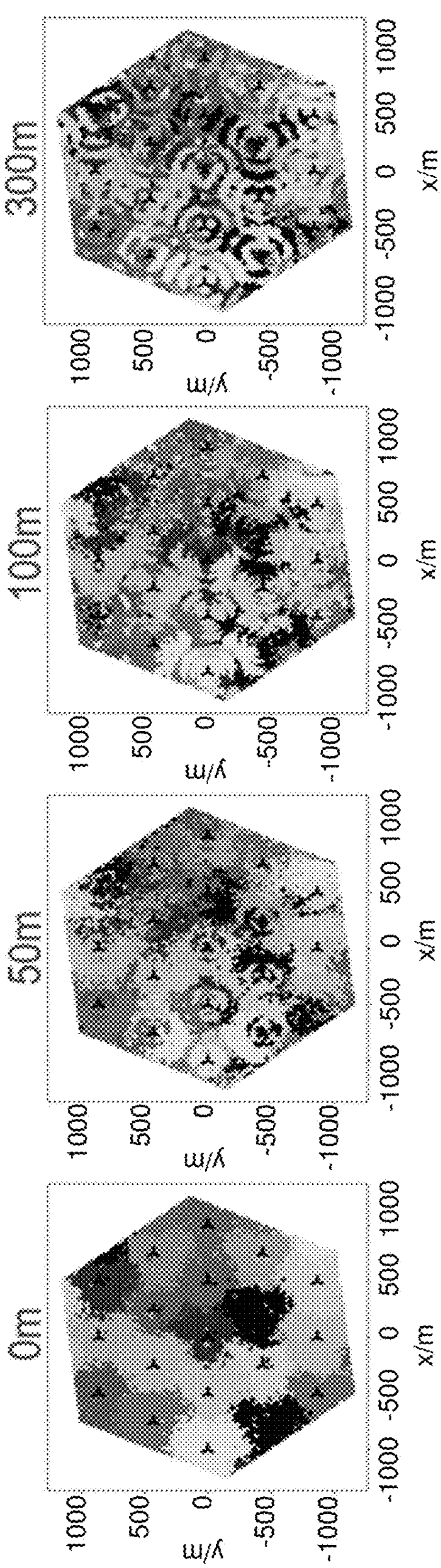
FIG. 2 schematically shows fragmented cell association patterns above ground, assuming the drone connects to the BS that provides the maximum received signal power.

FIG. 2 schematically shows fragmented cell association patterns above ground, assuming the drone connects to the BS that provides the maximum received signal power.

The other effect making the radio environment in the sky different from that on the ground is due to base station antenna side lobes/sidelobes. Every directional antenna emits radiation also in unwanted directions, known as sidelobes. The existing mobile networks are optimized for terrestrial broadband communication with the antennas of base stations being down-tilted to optimize the ground coverage and reduce the inter-cell interference. A terrestrial UE is usually served by the main lobe of the base station antenna. With down-titled base station antennas, drones flying in the sky may be served by the sidelobes of base station antennas.

The sidelobes give rise to the phenomenon of scattered cell associations particularly noticeable in the sky. The UE cell association is conventionally based on strongest received signal power, i.e., each position is associated with the cell from which the strongest signal is received at that position. The FIG. 2 shows the cell association patterns based on maximum received power at ground level, and heights of 50 m, 100 m, and 300 m in a simulated macro network. Devices in the areas marked by the same color/gray level are associated with the same site. It can be seen that the cell association patterns change dramatically with height. The cell association pattern on the ground is ideally a nicely defined and contiguous area where the best cell is most often the one closest to the UE. As we move up in height, the antenna sidelobes start to be visible, and the best (i.e. currently strongest) cell may no longer be the closest one. The cell association pattern in this particular scenario becomes fragmented especially at the height of 300 m and above.

It should be understood that the cell association pattern shown above only represents one specific scenario. The association pattern strongly depends on the deployment parameters such as inter-site distance, antenna patterns, antenna height, and down-tilt angles of the base station antennas.

Figure 3:
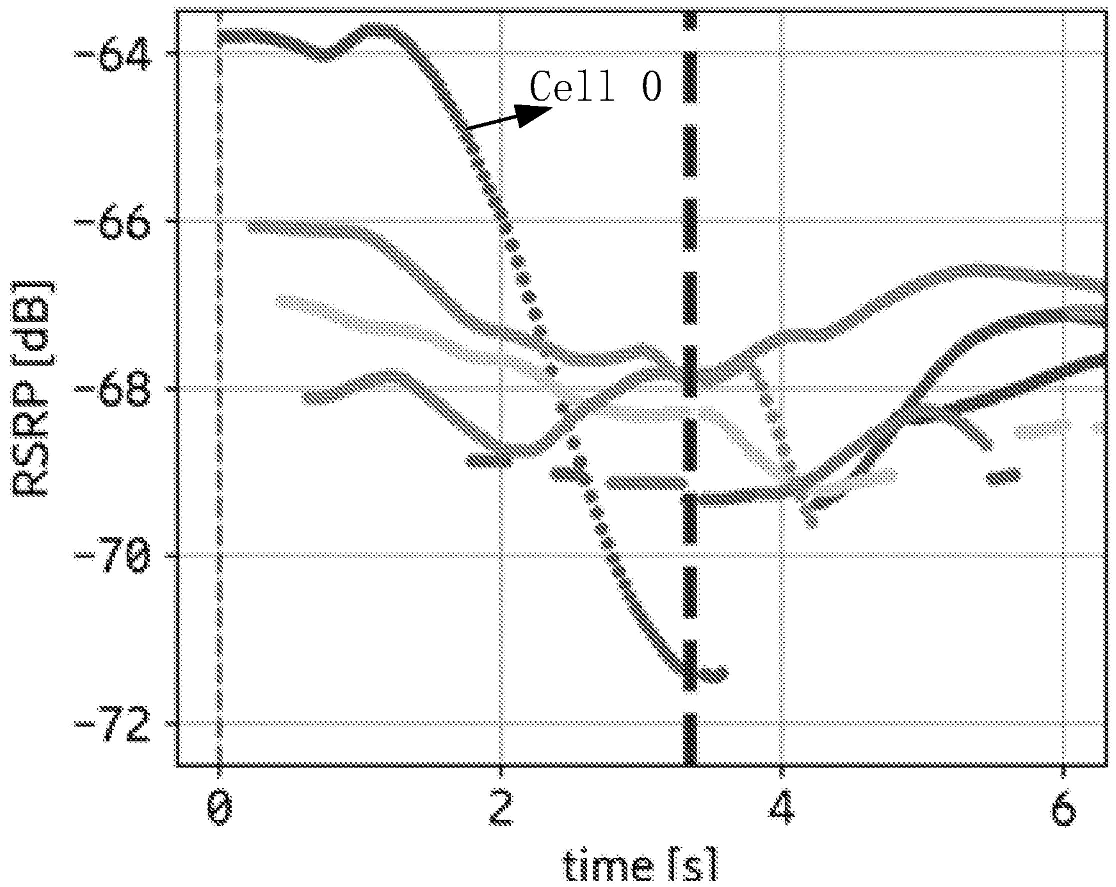
FIG. 3 schematically shows a sudden drop in signal strength—RSRP (Reference Signal Received Power).

FIG. 3 schematically shows a sudden drop in signal strength—RSRP (Reference Signal Received Power).

Drone UE served by sidelobes might experience very sharp drops in signal strength when moving in the sky. A simulated example is shown in FIG. 3, the UE's measurements of the signal strengths of the cells within reach. At the beginning of the simulation (marked by the dashed vertical line at the left side), the UE selects cell 0 as the serving cell. After a few seconds, the signal strength begins to drop rapidly, and before the UE can be handed over to another cell, it declares radio link failure at the time instant marked by the thick dashed line at the center side.

When drones move through the sidelobe nulls of base station antennas, the default mobility procedures might be too slow for successful execution.

Since mobility is a key requirement for many drone use cases, the network should offer quality mobility management service for seamless drone connectivity. As detailed above, the best cells may change frequently at the flight altitude of a drone. This requires fast and robust handovers between the cells to maintain connection.

Figure 4:
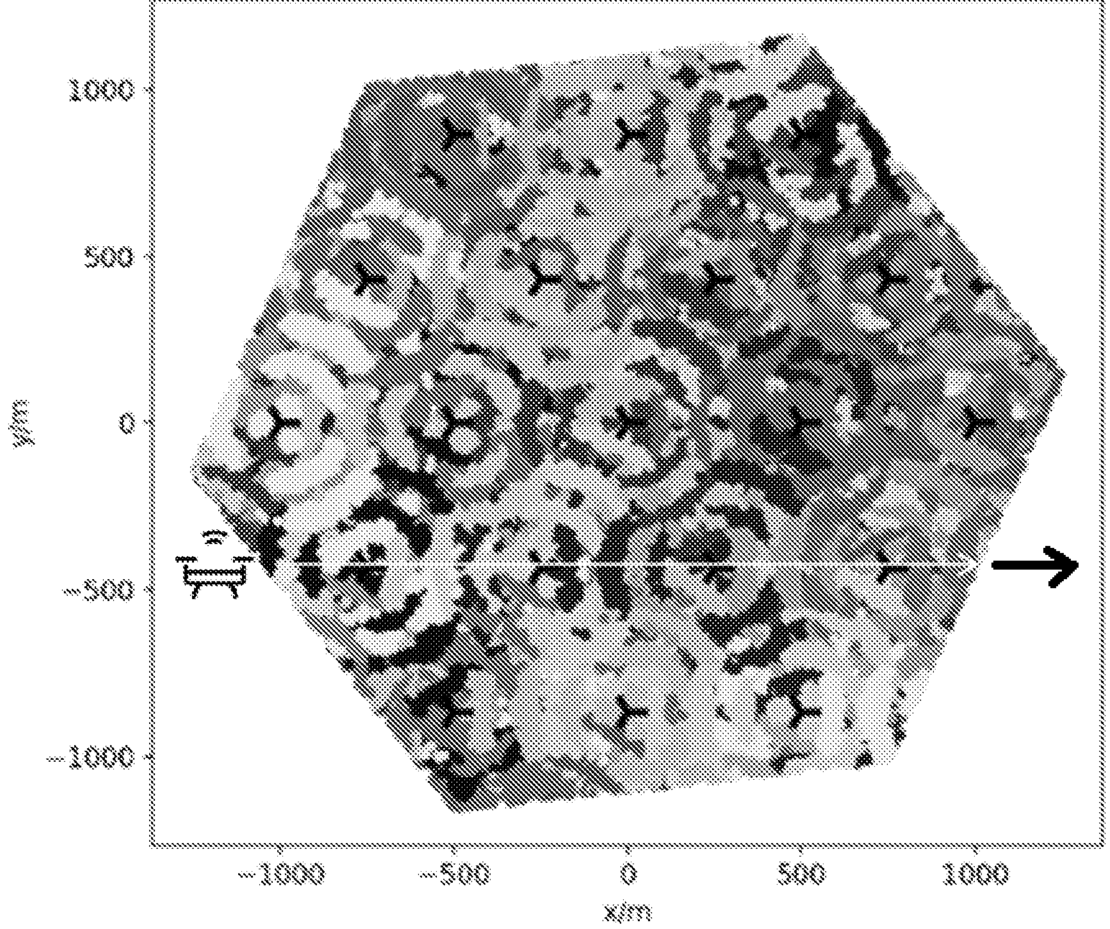
FIG. 4 schematically shows a simulated scenario where a drone served by base station sidelobes needs to carry out frequent handover procedures.

FIG. 4 schematically shows a simulated scenario where a drone served by base station sidelobes needs to carry out frequent handover procedures.

As shown in FIG. 4, when the drone crosses the border between different beams (indicated by different colors/gray levels), a handover happens.

Therefore, the solution of using existing terrestrial cellular networks to provide aerial coverage has below problems: scattered cell patterns caused by LOS propagation and side lobes, degraded mobility KPIs caused by scattered cell patterns, and sudden drop in signal strength.

In addition, BS and UAV cannot distinguish if signals in measurements are from main lobes or sidelobes, even in the case there are arrival/departure direction info (because the rays could be reflected).

There are multiple sidelobes for directional antennas. The antenna sidelobes are separated by antenna nulls. Antenna null is a direction in an antenna's radiation pattern where the antenna radiates almost no radio waves. The sidelobe nulls are covered by sidelobes from other cells, so the best cells may change frequently at the flight altitude of a drone, which lead to frequent handovers when drone files through the sidelobes. FIG. 4 shows a simulated scenario, where a drone flies with 160 km/h at 300 m altitude. The drone needs to execute frequent handover (more than 30 times within 1500 m, i.e., almost one handover every second with this scenario).

Certain aspects of the present disclosure and their embodiments may provide solutions to these or other challenges. There are, proposed herein, various embodiments which address one or more of the issues disclosed herein. Improved methods and apparatuses for communication management between a network node and a terminal device may be provided.

Figure 5:
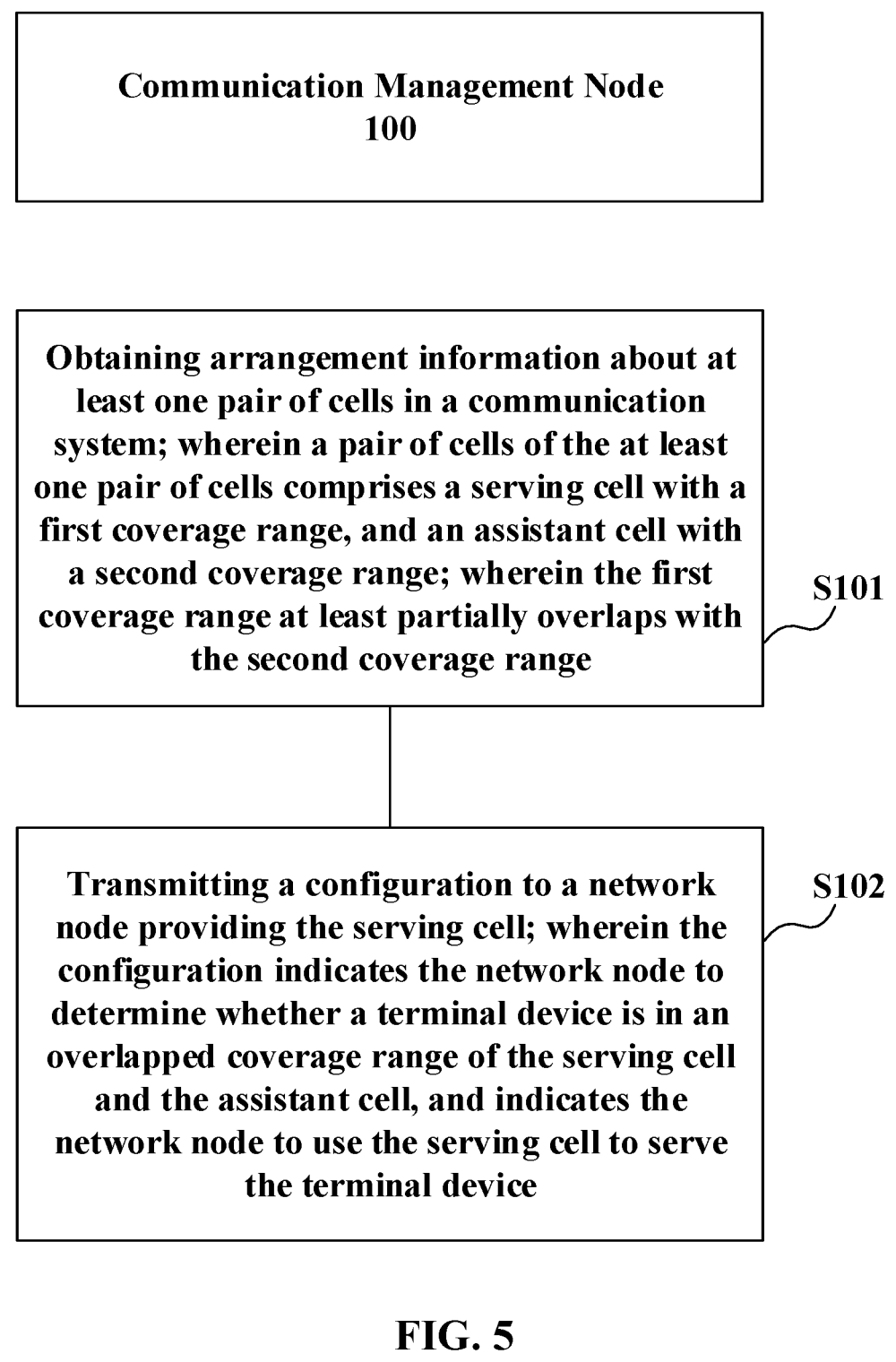

FIG. 5 is a flowchart illustrating a method performed by a communication management node, according to an embodiment of the present disclosure.

As shown in FIG. 5, the method performed by a communication management node 100 may comprise: S101, obtaining arrangement information about at least one pair of cells in a communication system; wherein a pair of cells of the at least one pair of cells comprises a serving cell with a first coverage range, and an assistant cell with a second coverage range; wherein the first coverage range at least partially overlaps with the second coverage range; and S102, transmitting a configuration to a network node providing the serving cell; wherein the configuration indicates the network node to determine whether a terminal device is in an overlapped coverage range of the serving cell and the assistant cell, and indicates the network node to use the serving cell to serve the terminal device.

According to embodiments of the present disclosure, since the overlapped coverage range of two cells is more unique than one cell in the communication system, the position of the terminal device may be more exactly determined by the network node, and the desired serving cell/beam may be used to serve the terminal device. Thus, the communication quality may be better ensured.

Further, more than one assistant cell may be associated with the same serving cell. Since the overlapped coverage range of more than two cells will be much more unique in the communication system, the position of the terminal device may be much more exactly determined by the network node.

Particularly, if different portions of the serving cell overlap with different assistant cells, it is possible for the network node to know in which portion of the serving cell the terminal device is. For example, a first assistant cell may overlap with a left side portion of the serving cell, and a second assistant cell may overlap with a right side portion of the serving cell. When the network node determines that a terminal device is in an overlapped coverage range of the serving cell and the first assistant cell, the network node will know the terminal device is in the left side portion.

In exemplary embodiments of the present disclosure, it is determined the terminal device is in the overlapped coverage range, when a measurement report of the terminal device comprises information about the serving cell and the assistant cell.

According to embodiments of the present disclosure, after setting pair of cells in the communication, it is capable for a network node to identify whether a terminal device is in desired/planned position range, based on a conventional measurement report from the terminal device. There is no extra burden for the terminal device, and the position determining procedure could be much faster.

In exemplary embodiments of the present disclosure, a boresight direction of an antenna for the serving cell and a boresight direction of an antenna for the assistant cell are basically the same.

The boresight direction usually determines the direction of the main lobe of the antenna. Thus, when the boresight direction of an antenna for the serving cell and a boresight direction of an antenna for the assistant cell are basically the same, their main lobes may cover the same overlapped coverage range from the same direction. Comparing covering the same overlapped coverage range from the different directions, the overlapped coverage range may be wider, since the power capability of the serving cell may be more efficiently utilized. Further, there will be less limitation for the relative positions for antennas generating the serving cell and the assistant cell. For example, they could be very close and also can be rather far away.

In exemplary embodiments of the present disclosure, the serving cell and the assistant cell are provided by the same network node; or the serving cell and the assistant cell are provided by different network nodes.

According to embodiments of the present disclosure, the pair of cells may be generated by using existing network nodes/antennas. For example, any two cells with overlapped coverage range may be configured as the pair of cells, no matter their associated antennas are in the same network node or in the different network nodes.

Further, if there are no such overlapped cells in certain positions of the communication system, some nearby antennas may be further adjusted with certain tilt/direction to cover such positions, no matter the antennas are at the same network node or the different network nodes. It should be understood new antenna or even new network node may be also set for generating the pair of cells.

In exemplary embodiments of the present disclosure, the network node instructs a handover of the terminal device from the serving cell to another serving cell of another pair of cells, when the terminal device is in an overlapped coverage range of the another pair of cells.

According to embodiments of the present disclosure, an improved handover criterion may be also provided. That is, other interference cells not in a pair of cells may be automatically ignored, even when they have stronger power than the current serving cell. Therefore, the serving cell for the terminal device in certain positions will be much more predictable and configurable.

In exemplary embodiments of the present disclosure, the handover is instructed, when a signal quality of the another serving cell is better than a signal quality of the serving cell.

According to embodiments of the present disclosure, the terminal device in this position may be served by the serving cell with better signal quality via handover. That is, the serving quality for the terminal device may still be ensured.

In exemplary embodiments of the present disclosure, the network node comprises a base station, such as a node B (NodeB or NB), an evolved NodeB (eNodeB or eNB), a next generation NodeB (gNodeB or gNB), etc.

In exemplary embodiments of the present disclosure, the terminal device comprises an aircraft. It should be understood that terminal device may be any other kind of terminal device, such as those terminal devices on the ground when they also have the need to be covered by the pair of cells.

In exemplary embodiments of the present disclosure, the communication management node may be any node/entity having management functions, such as the operation administration and maintenance (OAM) entity.

Figure 6:
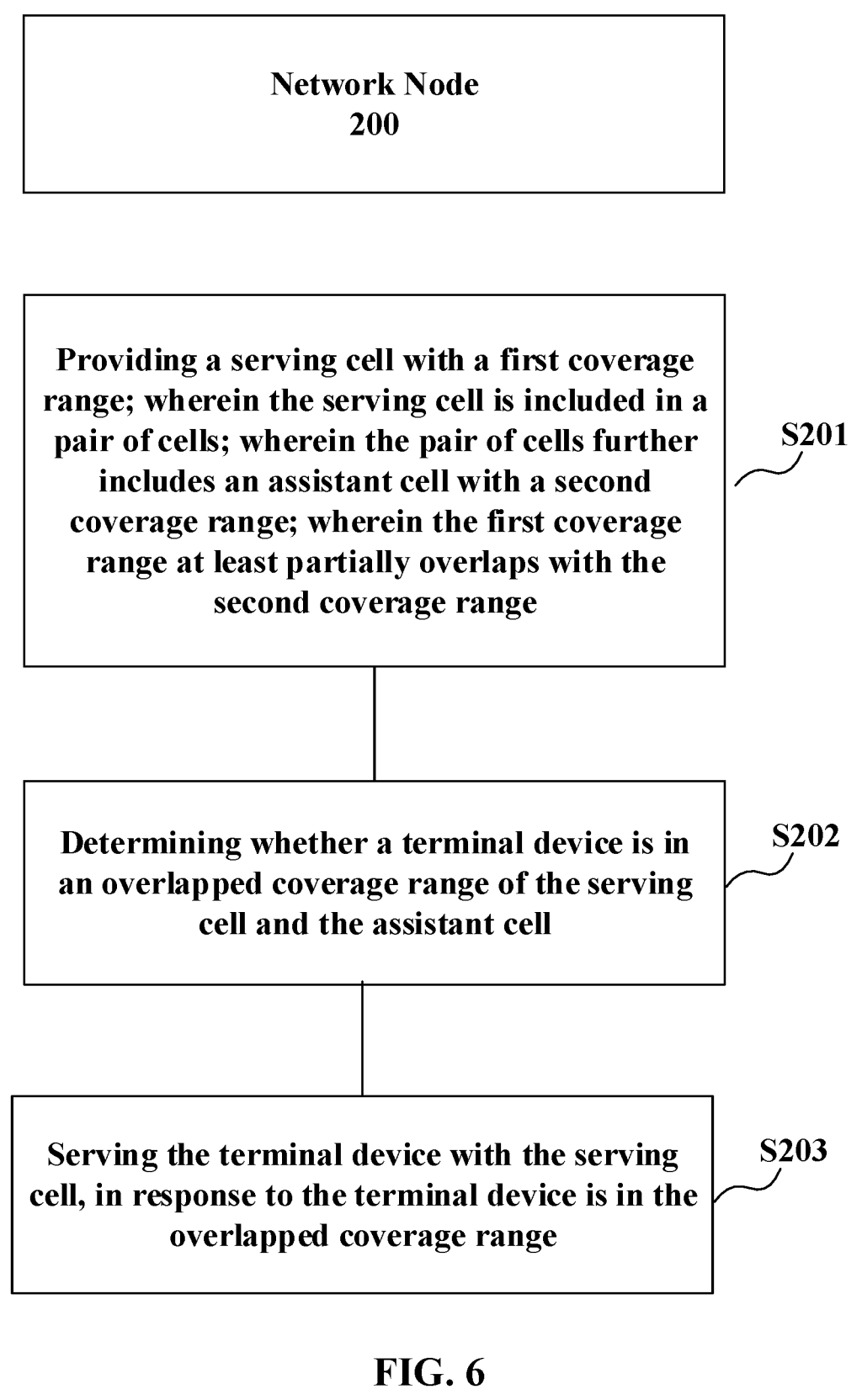

FIG. 6 is a flowchart illustrating a method performed by a network node, according to an embodiment of the present disclosure.

As shown in FIG. 6, the method performed by a network node may comprise: S201, providing a serving cell with a first coverage range; wherein the serving cell is included in a pair of cells; wherein the pair of cells further includes an assistant cell with a second coverage range; wherein the first coverage range at least partially overlaps with the second coverage range; S202, determining whether a terminal device is in an overlapped coverage range of the serving cell and the assistant cell; and S203, serving the terminal device with the serving cell, in response to the terminal device is in the overlapped coverage range.

According to embodiments of the present disclosure, the network node may determine whether the network node is in a certain position more exactly, and the desired serving cell/beam may be used to serve the terminal device. Thus, the communication quality (such as stability) may be better ensured.

FIG. 7 is a flowchart illustrating an additional step of the method in FIG. 6, according to an embodiment of the present disclosure.

In exemplary embodiments of the present disclosure, S202, determining whether a terminal device is in an overlapped coverage range of the serving cell and the assistant cell further comprises S2021, determining the terminal device is in the overlapped coverage range, when a measurement report of the terminal device comprises information about the serving cell and the assistant cell.

According to embodiments of the present disclosure, the network node may identify whether a terminal device is in desired/planned position range, based on a conventional measurement report from the terminal device.

In exemplary embodiments of the present disclosure, a boresight direction of an antenna for the serving cell and a boresight direction of an antenna for the assistant cell are basically the same.

FIG. 8A is a flowchart illustrating an additional step of the method in FIG. 6, according to an embodiment of the present disclosure.

In exemplary embodiments of the present disclosure, the method further comprises: S204, instructing a handover of the terminal device from the serving cell to another serving cell of another pair of cells, when the terminal device is in an overlapped coverage range of the another pair of cells.

According to embodiments of the present disclosure, unnecessary handover of the terminal device to undesired interference cell/beam may be avoided.

Figure 8B:
FIG. 8B is a flowchart illustrating additional steps of the method in FIG. 6, according to an embodiment of the present disclosure.

FIG. 8B is a flowchart illustrating additional steps of the method in FIG. 6, according to an embodiment of the present disclosure.

In exemplary embodiments of the present disclosure, the method further comprises: S205, determining whether a signal quality of the another serving cell is better than a signal quality of the serving cell; and S206, instructing the handover of the terminal device from the serving cell to the another serving cell, in response to that the signal quality of the another serving cell is better.

In exemplary embodiments of the present disclosure, the network node comprises a base station.

In exemplary embodiments of the present disclosure, the terminal device is an aircraft.

In exemplary embodiments of the present disclosure, the serving cell and the assistant cell are provided by the same network node; or the serving cell and the assistant cell are provided by different network nodes.

Figure 9:
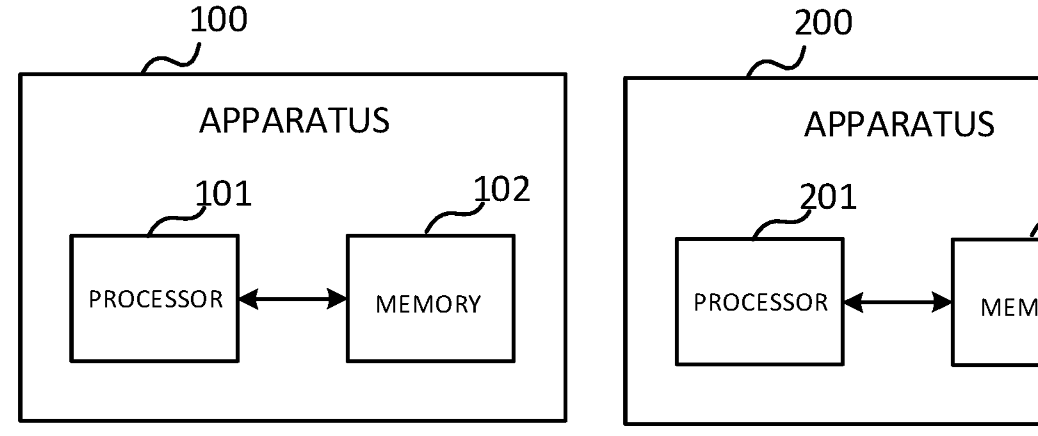
FIG. 9 is a block diagram illustrating apparatus for the communication management node and the network node, according to some embodiments of the present disclosure.

FIG. 9 is a block diagram illustrating apparatus for the communication management node and the network node, according to some embodiments of the present disclosure.

As shown in FIG. 9, the communication management node 100 may comprise: a processor 101; and a memory 102, the memory containing instructions executable by the processor, whereby the communication management node is operative to: obtain arrangement information about at least one pair of cells in a communication system; wherein a pair of cells of the at least one pair of cells comprises a serving cell with a first coverage range, and an assistant cell with a second coverage range; wherein the first coverage range at least partially overlaps with the second coverage range; and transmit a configuration to a network node providing the serving cell; wherein the configuration indicates the network node to determine whether a terminal device is in an overlapped coverage range of the serving cell and the assistant cell, and indicates the network node to use the serving cell to serve the terminal device.

In exemplary embodiments of the present disclosure, the communication management node is further operative to perform the method according to any of embodiments described above, such as shown in FIG. 5.

As shown in FIG. 9, the network node 200 may comprise: a processor 201; and a memory 202, the memory containing instructions executable by the processor, whereby the network node is operative to: provide a serving cell with a first coverage range; wherein the serving cell is included in a pair of cells; wherein the pair of cells further includes an assistant cell with a second coverage range; wherein the first coverage range at least partially overlaps with the second coverage range; determine whether a terminal device is in an overlapped coverage range of the serving cell and the assistant cell; and serve the terminal device using the serving cell.

In exemplary embodiments of the present disclosure, the network node is further operative to perform the method according to any of embodiments described above, such as shown in FIG. 6-8.

The processors 101, 201 may be any kind of processing component, such as one or more microprocessor or microcontrollers, as well as other digital hardware, which may include digital signal processors (DSPs), special-purpose digital logic, and the like. The memories 102, 202 may be any kind of storage component, such as read-only memory (ROM), random-access memory, cache memory, flash memory devices, optical storage devices, etc.

Further, there is provided a communication system, comprising the network node according to any of embodiments described above. The communication system may be any kind of system under the protocols of the first generation (1G), 2G, 3G, 4G, 4.5G, 5G communication protocols, and/or any other protocols either currently known or to be developed in the future.

Figure 10:
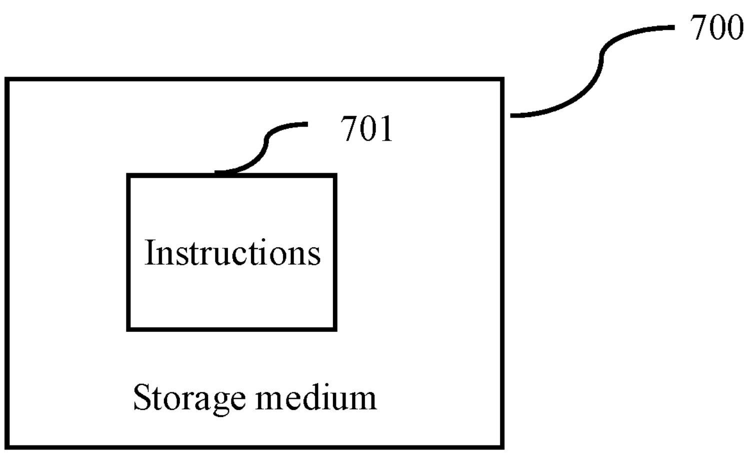
FIG. 10 is a block diagram showing a computer readable storage medium in accordance with embodiments of the present disclosure.

FIG. 10 is a block diagram showing a computer readable storage medium in accordance with embodiments of the present disclosure.

As shown in FIG. 10, there is provided a computer-readable storage medium 700 storing instructions 701 which when executed by at least one processor, cause the at least one processor to perform the method according to any of embodiments described above. For example, the computer-readable storage medium 700 may comprise instructions 701 to be executed by a processor 101 in a communication management node to perform method in FIG. 5, or may comprise instructions 701 to be executed by a processor 201 in a network node to perform method in FIG. 6-8.

The computer readable storage medium 700 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 11:
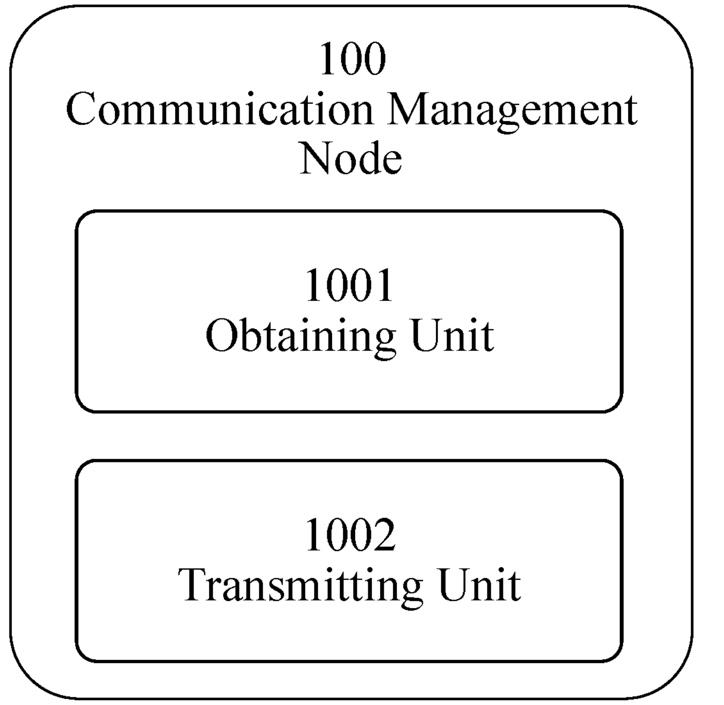
FIG. 11 is a schematic showing function units of the communication management node.

FIG. 11 is a schematic showing function units of the communication management node.

As shown in FIG. 11, the communication management node may comprise: an obtaining unit 1001, configured to obtain arrangement information about at least one pair of cells in a communication system; wherein a pair of cells of the at least one pair of cells comprises a serving cell with a first coverage range, and an assistant cell with a second coverage range; wherein the first coverage range at least partially overlaps with the second coverage range; and a transmitting unit 1002, configured to transmit a configuration to a network node providing the serving cell; wherein the configuration indicates the network node to determine whether a terminal device is in an overlapped coverage range of the serving cell and the assistant cell, and indicates the network node to use the serving cell to serve the terminal device.

Figure 12:
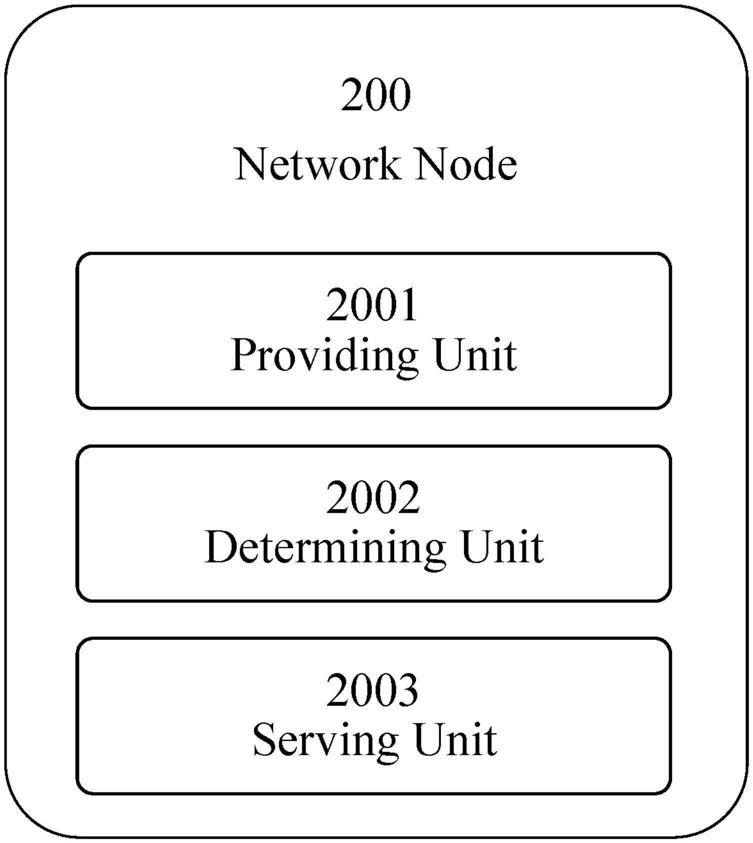
FIG. 12 is a schematic showing function units of the network node.

FIG. 12 is a schematic showing function units of the network node.

As shown in FIG. 12, the network node may comprise: a providing unit 2001, configured to provide a serving cell with a first coverage range; wherein the serving cell is included in a pair of cells; wherein the pair of cells further includes an assistant cell with a second coverage range; wherein the first coverage range at least partially overlaps with the second coverage range; a determining unit 2002, configured to determine whether a terminal device is in an overlapped coverage range of the serving cell and the assistant cell; and a serving unit 2003, configured to serve the terminal device using the serving cell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the communication management node or network node may not need a fixed processor or memory, any computing resource and storage resource may be arranged from at least one node in the communication system. The introduction of virtualization technology and network computing technology may improve the usage efficiency of the network resources and the flexibility of the network.

Embodiments herein afford many advantages. For example, some embodiments herein may provide at least one pair of cells in a communication system. The network node may determine whether a terminal device is in an overlapped coverage range of the serving cell and the assistant cell in one pair of cells, and use the serving cell to serve the terminal device. Since the overlapped coverage range of two cells is more unique than one cell in the communication system, the position of the terminal device may be more exactly determined by the network node, and the desired serving cell/beam may be used to serve the terminal device. Thus, the communication quality may be better ensured. A person skilled in the art will recognize additional features and advantages upon reading the following detailed description.

Particularly, some embodiments of the present disclosure provide solutions for circumventing sidelobes in aerial coverage. Some solutions are to (1) select a set of cells as serving cells to provide coverage, in some particular embodiments the serving cells may be used to provide aerial coverage, and thus may be also called as aerial coverage cells, (2) select a set of cells as assistant cells, in some particular embodiments the assistant cells may be specifically used to indicate mainlobes, and thus may be also called as mainlobe indicator cells, and (3) bypass other cells for aerial coverage. Then, an aerial coverage cell and a mainlobe indicator cell are combined in a cell pair. Then by checking the measurement results, handover decisions can be made to largely ensure an aerial UE to be served by the main lobes of BS antennas, even though the sidelobes may provide stronger received signal powers. It should be understood that the serving cell may be also used to provide other kind of coverages, such as ground coverages, and the assistant cell may be also used to indicate other information (even sidelobes in some cases) about the serving cell.

Therefore, the proposed solutions help ensure that aerial UEs are served by the main lobes of BS antennas, even though the sidelobes may provide stronger received signal powers. This avoids the scattered cell association patterns and sudden signal strength drops resulted from sidelobe connections in the aerial coverage. Thus, the proposed methods help reduce handover events and radio link failures in aerial coverage, leading to more robust mobility support in the sky.

This is a cost-efficient solution for aerial coverage without hardware changes. It may find applications beyond aerial coverage, e.g. a 5G terrestrial coverage scenario where complex sidelobe patterns exist.

Further detailed implementation embodiments will be illustrated below.

As mentioned above, existing solutions using cellular networks with down-tilted BS antennas cannot provide satisfactory aerial coverage especially at higher altitude for example 300 m and above. With existing solutions, drones flying in the sky may move in the areas where the sidelobes are pointing to, and the drones might be served by the sidelobes most of the time. However, existing 4G/5G BSs and antennas have the capability to provide continuous aerial coverage up to e.g., 6-8 km by main lobes (mainlobes) already but the stronger sidelobes in the sky lead to fragmented, scattered cell association patterns. It is also desired to use main lobes instead of sidelobes for aerial coverage.

Figure 13:
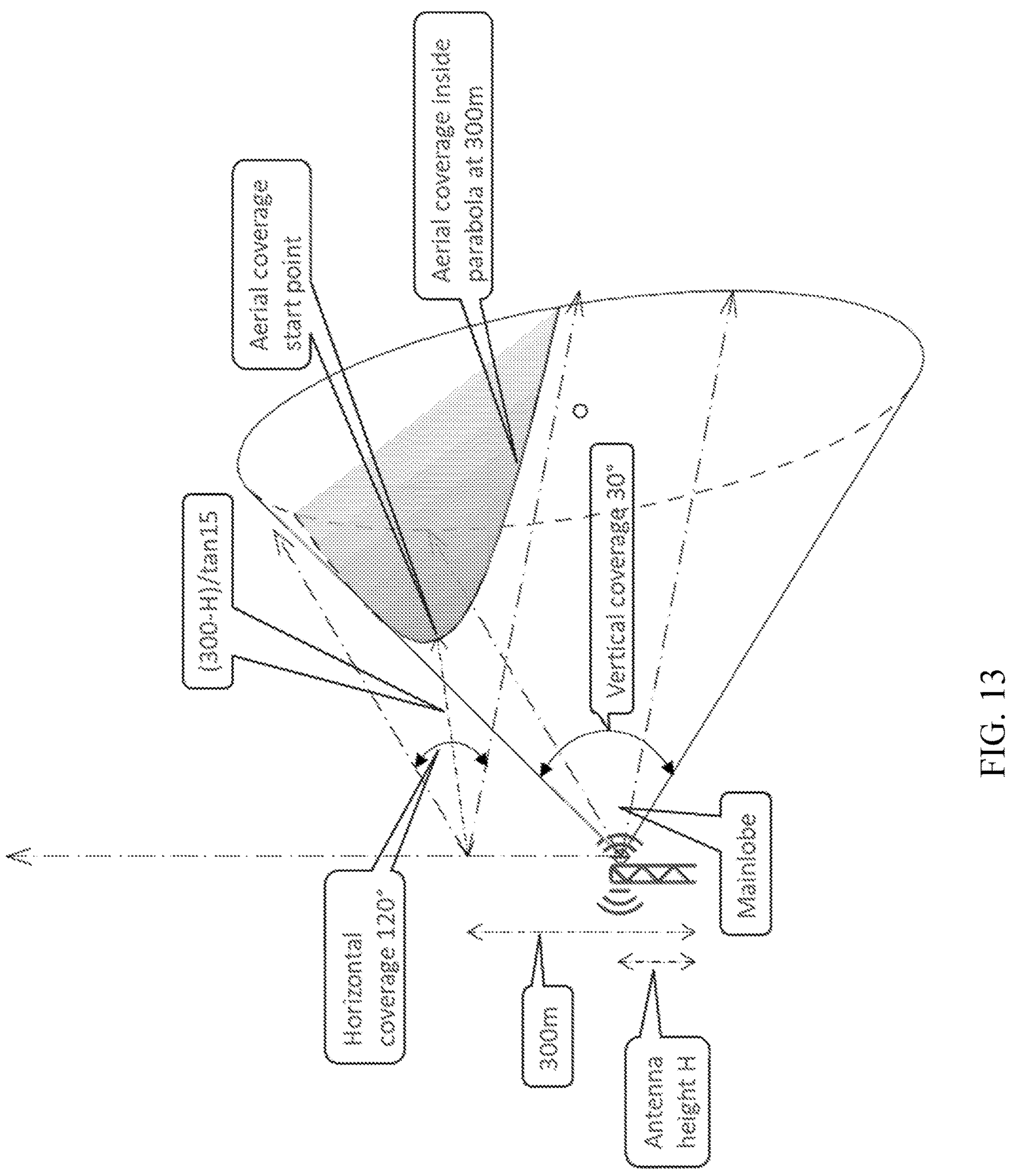
FIG. 13 is a schematic showing an illustration of the geometry for aerial coverage served by antenna mainlobe.

FIG. 13 is a schematic showing an illustration of the geometry for aerial coverage served by antenna mainlobe.

As shown in FIG. 13, a directional antenna (for simplicity of illustration, the antenna is shown without tilt) is used to provide terrestrial and aerial coverage at the same time. In the figure, H denotes antenna height. The intersecting surface of mainlobe beam and the plane at the altitude of 300 m are paraboloid within the parabola curve. Drones flying at 300 m can be served by the mainlobe within the scope of paraboloid. According to trigonometry, the distance from paraboloid's vertex to the vertical axis of antenna is)(300-H)/tan(15°), which means the antenna mainlobe starts to be visible) (300-H)/tan(15°) away from the vertical antenna axis. The distance can be changed if the antenna is down-tiled or up-tiled.

Figure 14:
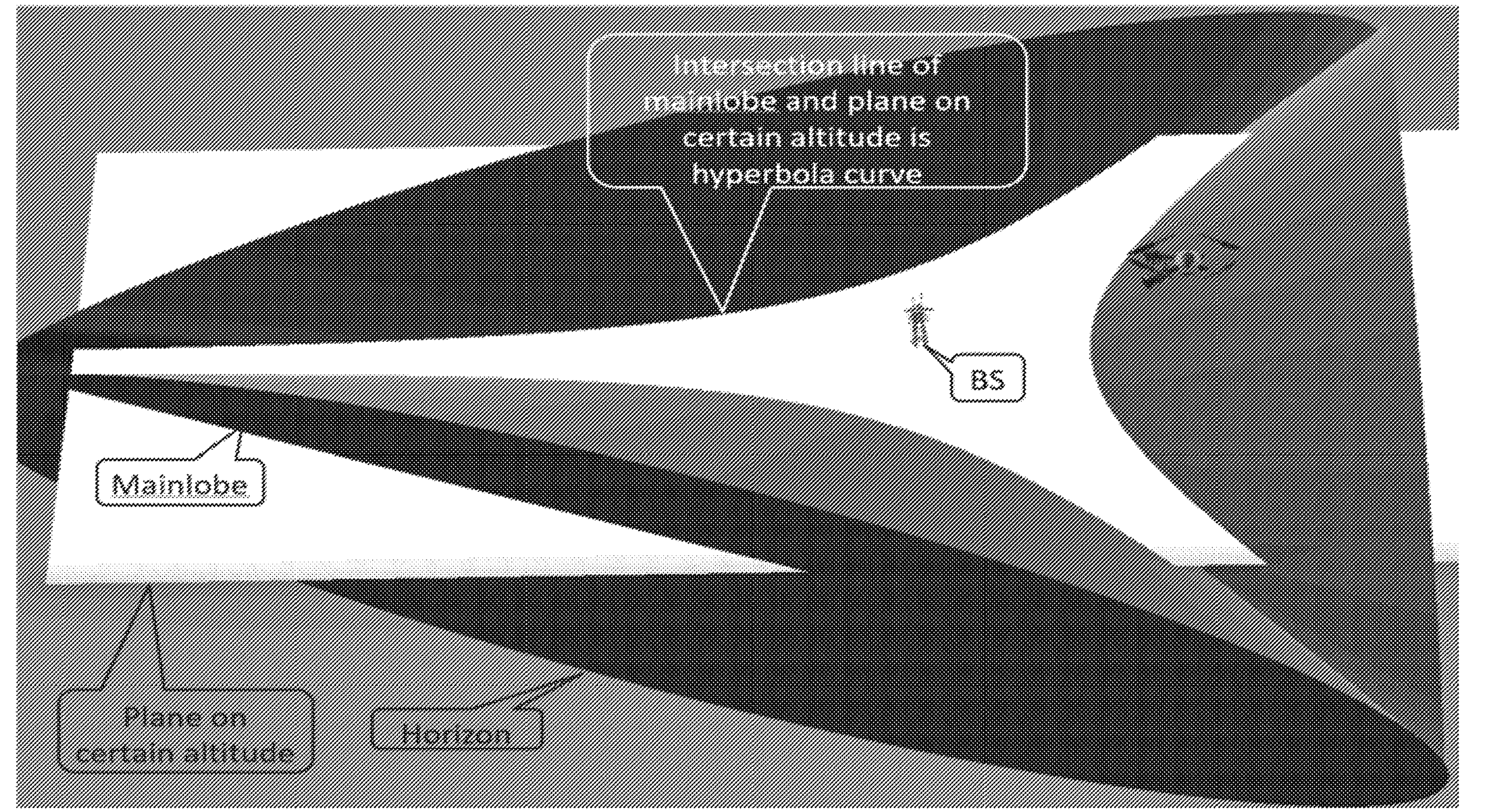
FIG. 14 is a schematic showing a 3D illustration of the mainlobe coverage at a certain altitude.
Figure 15:
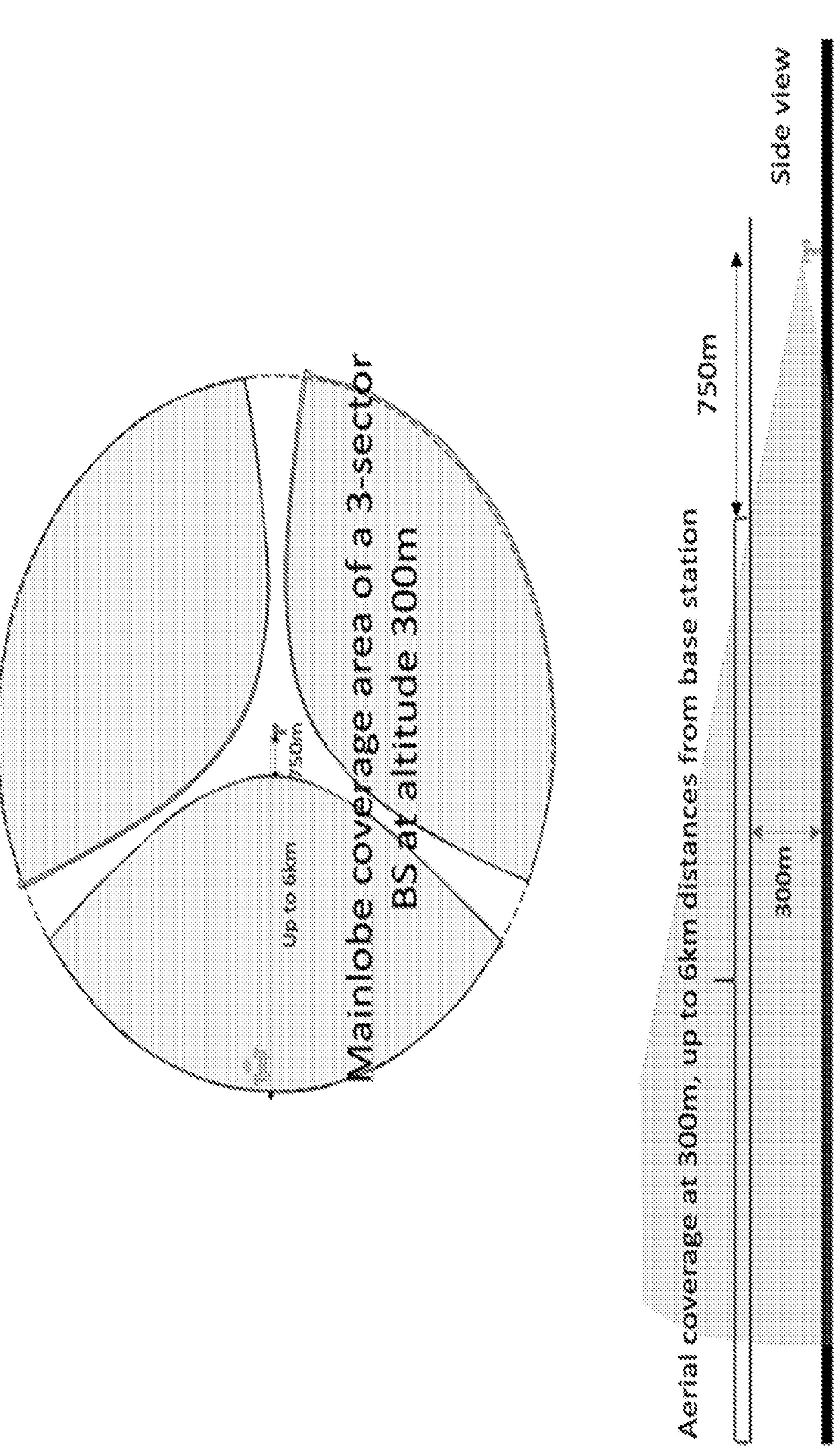
FIG. 15 is a schematic showing an illustration of the wide, continuous coverage at 300 m height served by the mainlobe.

FIG. 14 is a schematic showing a 3D illustration of the mainlobe coverage at a certain altitude. FIG. 15 is a schematic showing an illustration of the wide, continuous coverage at 300 m height served by the mainlobe.

For example, a conventional cellular network base station may use three sectors and three antennas. This antenna sectorization technique ensures that sectors of the same base station do not interfere with each other as much as possible. At the altitude of 300 m, the aerial coverage served by one base station without sidelobes (this is an artificial scenario for illustration purpose) is illustrated in the two figures FIG. 14, 15, where we assume the antenna's height H=100 m, antenna mainlobe starts to be visible 750 m away from the antenna.

In short, if there are no sidelobes, flying drones would be served by the main lobes of BS antennas. Unfortunately, since the sidelobes may provide stronger received signal powers, their existence makes the flying drones be connected to the sidelobes that provide fragmented coverage in the sky. The table 1 below compares the coverage characteristics associated with conventional solution, where drones may be connected to sidelobes, and the ideal case, where each BS antenna only has a main lobe.

between sidelobes are solved by the much fewer main lobes that can provide wide, continuous coverage.

Figure 16:
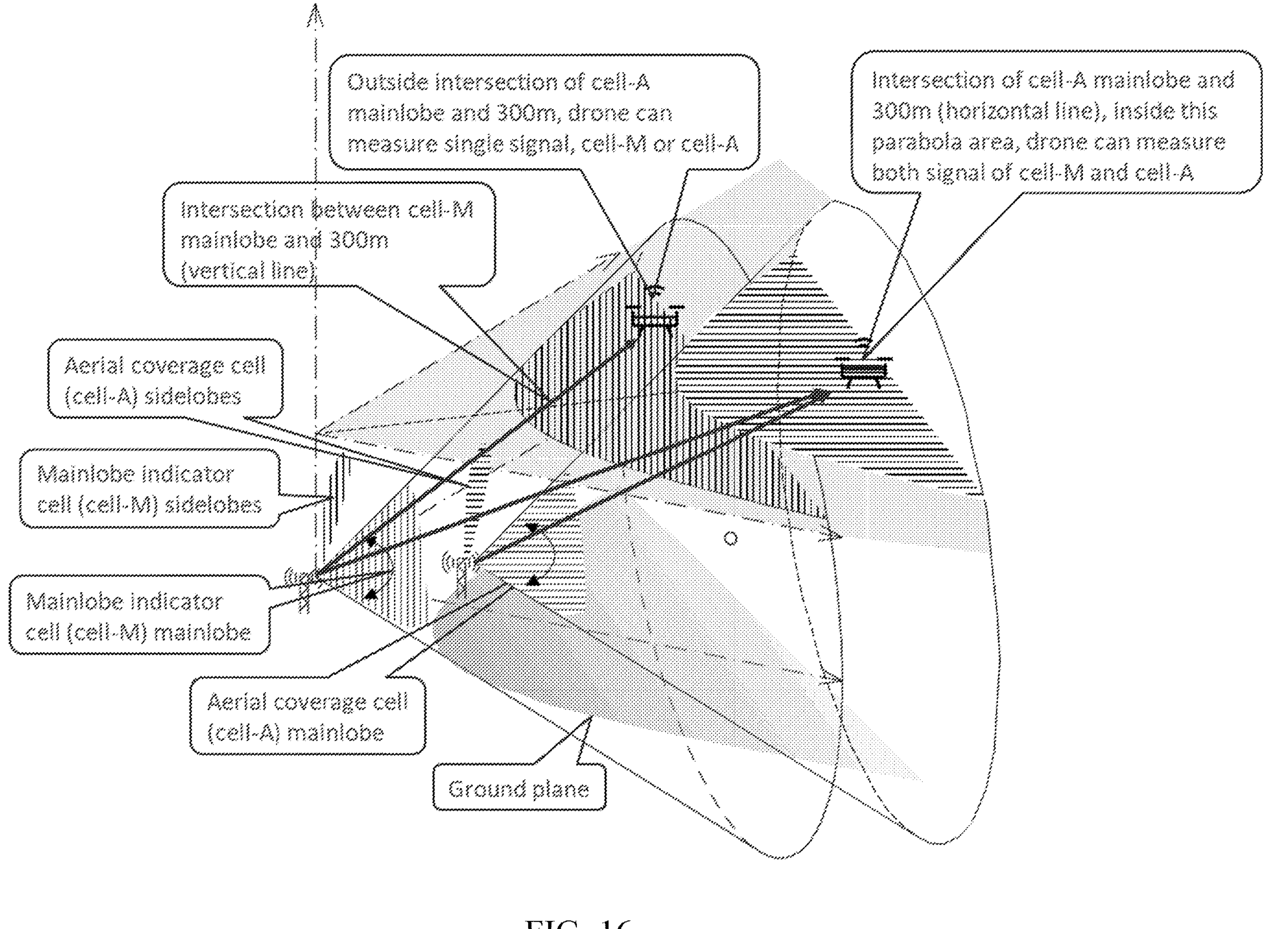
FIG. 16 is a schematic showing an illustration of the pairing of "mainlobe indicator cell" and "aerial coverage cell".

FIG. 16 is a schematic showing an illustration of the pairing of "mainlobe indicator cell" and "aerial coverage cell".

The main idea of the solution to mitigate sidelobes' effect is to introduce the notion of an assistant cell (i.e., "mainlobe indicator cell"), which can be used to indicate the steering range of the main lobe of a serving cell (i.e., the aerial coverage cell). The proposed idea is illustrated in the FIG. 16, wherein the mainlobe indicator cell is denoted as cell M and labeled as by vertical lines and the aerial coverage cell is denoted as cell A and labeled by horizontal lines.

In the network, a set of cells are selected to provide aerial coverage above certain height (i.e., cells labeled by horizontal lines), a set of cells are selected as mainlobe indicator cells (i.e., cells labeled by vertical lines), while other cells will be bypassed with the proposed solution for aerial coverage. An aerial coverage cell and a mainlobe indicator cell are combined in a cell pair. An aerial coverage cell and a mainlobe indicator cell can be located in neighboring sites and have similar antenna pointing directions. By careful network planning, the cells in a pair can have overlapping mainlobe coverage and non-overlapping sidelobe coverage within a three-dimensional space region in the sky.

Figure 17:
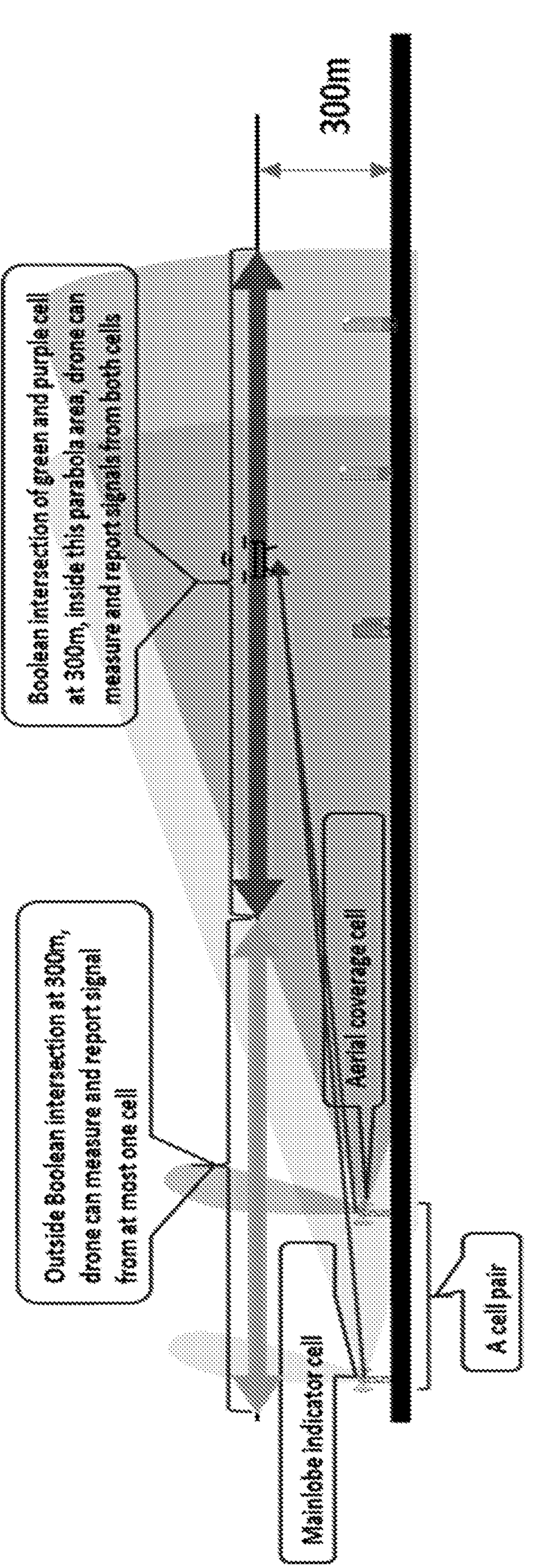
FIG. 17 is a schematic showing a geometrical illustration of the antenna lobes associated with a pair of mainlobe indicator cell and aerial coverage cell.

FIG. 17 is a schematic showing a geometrical illustration of the antenna lobes associated with a pair of mainlobe indicator cell and aerial coverage cell.

Further, it will be described how to utilize the paired mainlobe indicator cell and aerial coverage cell. FIG. 17 provides a geometrical illustration of the antenna lobes associated with a pair of mainlobe indicator cell and aerial coverage cell. According to the geometrical relation, the Boolean intersection of the aerial coverage of the aerial coverage cell and the mainlobe indicator cell in a pair at a certain altitude is a coverage area that an aerial UE can measure signals and report measurement results of both cells. The Boolean intersection of a cell pair is marked with the right arrow in FIG. 17. Outside the Boolean intersection

TABLE 1

Comparison of aerial coverage for cells with and without sidelobes.

| | Cells with sidelobes (Drones may be connected to sidelobes) | Cells without sidelobes (Ideal, artificial scenario) |
|---|---|---|
| Cell pattern | 60 cells, scattered cell pattern | A few cells, continuous coverage |
| Mobility | Frequent handover: once every 30 meters for a speed of 160 km/h (i.e., once every second) | Very few handovers: once every several kilometers |
| Call drop rate | High drop rate due to sudden drop in signal strength between sidelobes | Handover procedures are executed between mainlobes without the problem of sudden drop in signal strength |

Therefore, it is desired to circumvent sidelobes in aerial coverage.

The previous analysis points out that it would be desirable to use main lobes, rather than sidelobes, to provide aerial coverage. The aerial coverage challenges caused by sidelobes can be solved by ensuring that the sidelobe signals are ignored by the system even a drone reports sidelobe signals are better. Then, the drone can be served by main lobes all the time. Accordingly, the serving cells may not change frequently at the flight altitude compared to the case where drones are served by sidelobes, and mobility challenges due to rapid changes in signal strengths and deep antenna nulls area, the aerial UE can measure and report at most one cell of a cell pair (inside the area marked by the left arrow in FIG. 17).

Figure 18:
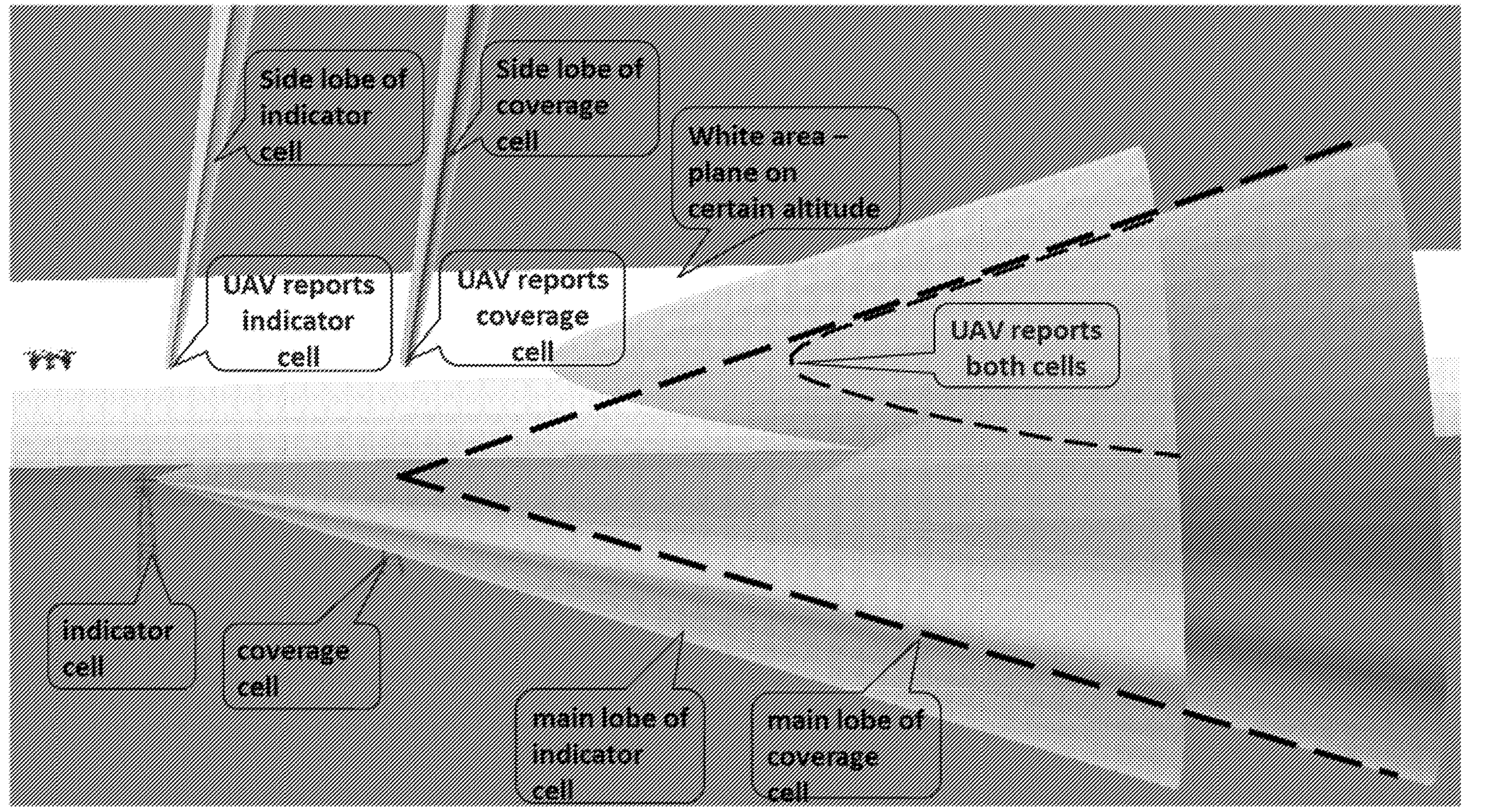
FIG. 18 is a schematic showing a 3D geometrical illustration of the antenna lobes associated with a pair of mainlobe indicator cell and aerial coverage cell.

FIG. 18 is a schematic showing a 3D geometrical illustration of the antenna lobes associated with a pair of mainlobe indicator cell and aerial coverage cell. In FIG. 18, 3D geometrical illustration corresponding to FIG. 17 is shown.

Figure 19:
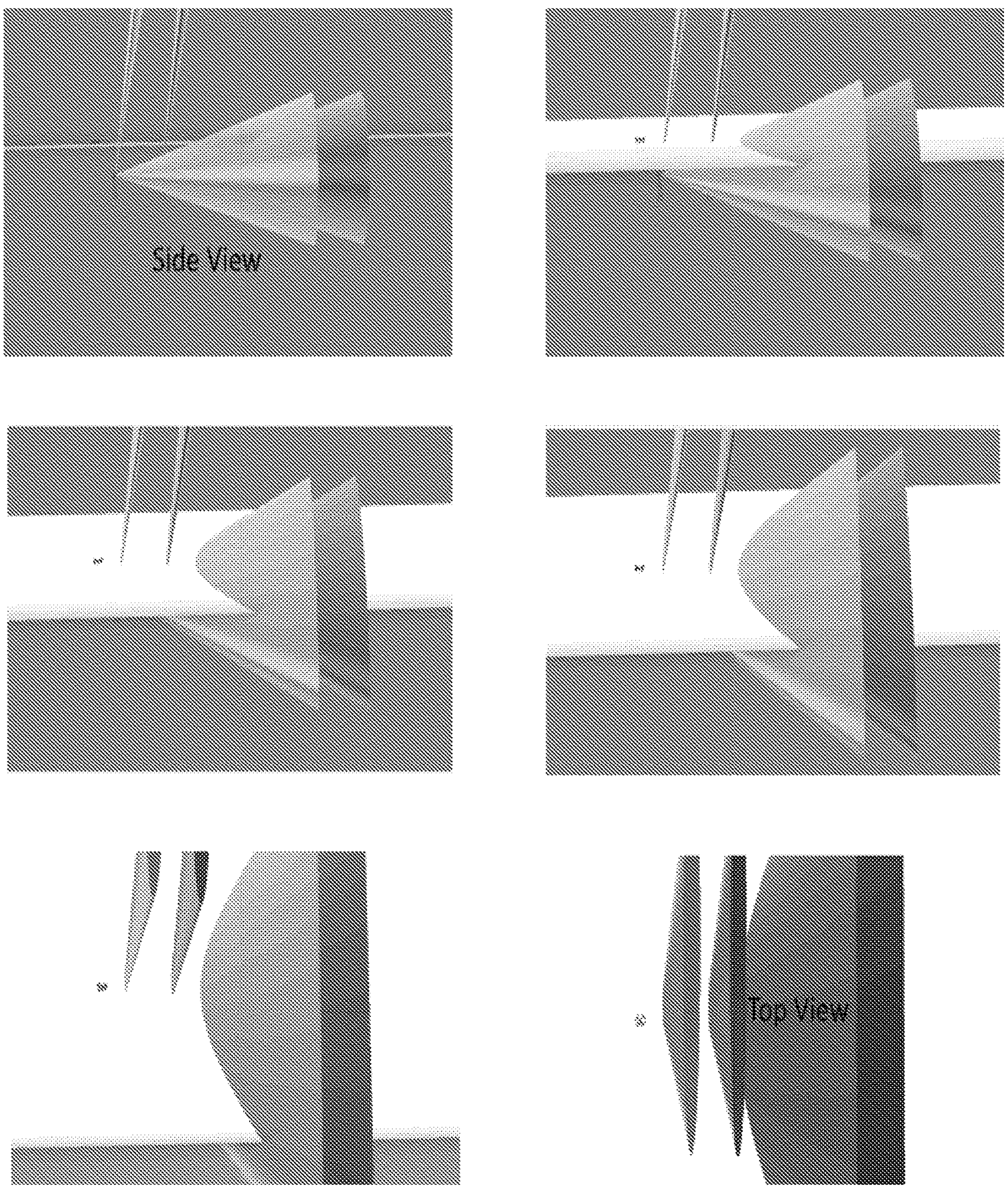
FIG. 19 provides a further geometrical illustration of the antenna lobes associated with a pair of mainlobe indicator cell and aerial coverage cell, with different view angles which rotates from a side view (as shown in FIG. 18) to a top view gradually.

FIG. 19 provides a further geometrical illustration of the antenna lobes associated with a pair of mainlobe indicator cell and aerial coverage cell, with different view angles which rotates from a side view (as shown in FIG. 17) to a top view gradually.

Figure 20A:
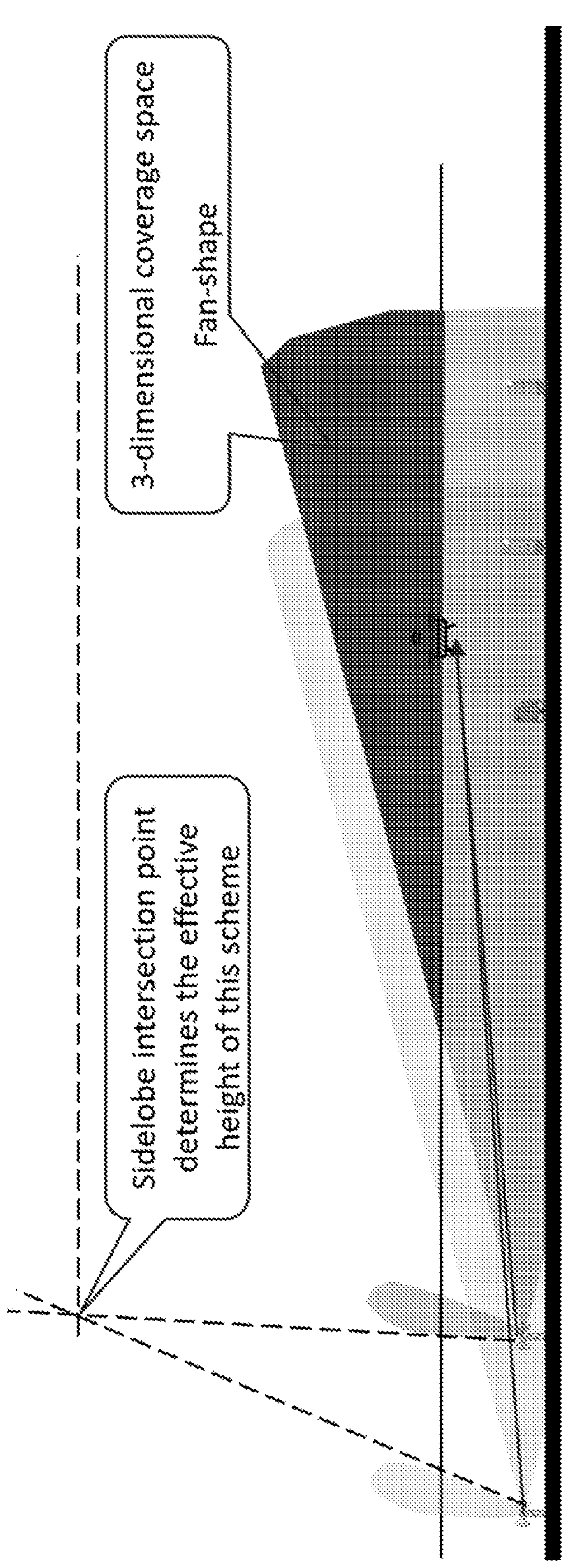
FIG. 20A, 20B are illustrations of the fan-shape and ladder-shape coverage space.
Figure 20B:
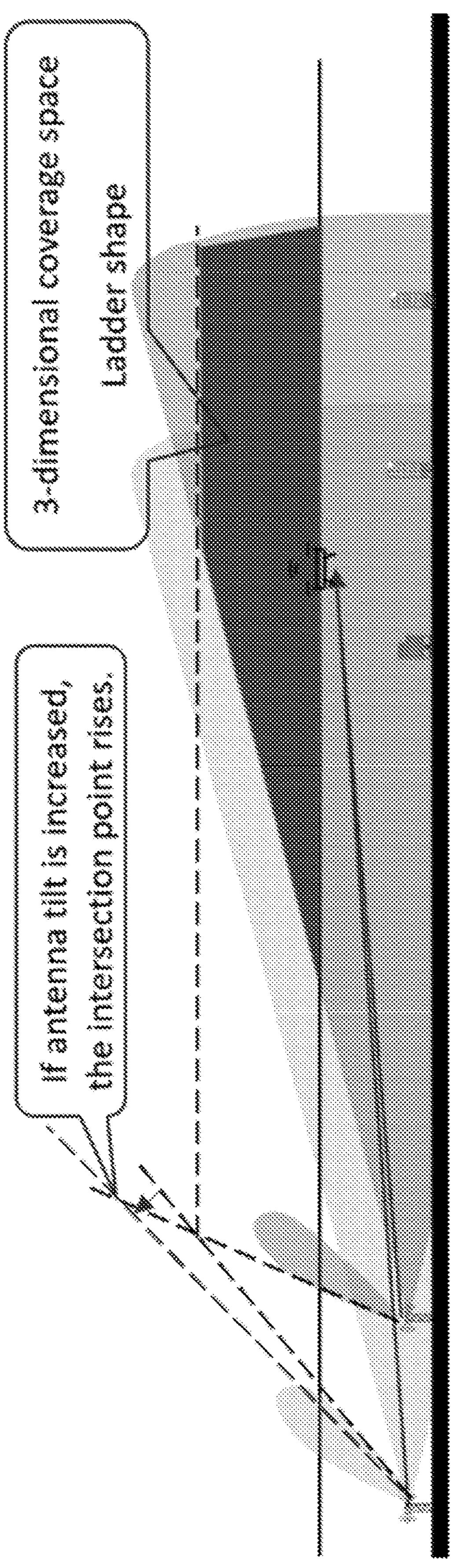

FIG. 20A, 20B are illustrations of the fan-shape and ladder-shape coverage space.

The above analysis is based on that the aerial UE flies at a certain height. More generally, this scheme provides 3D coverage space and its shape/dimension varies for different configurations. Depending on the configuration, the side view could be fan-shape or ladder-shape, as illustrated in FIG. 20A, 20B respectively.

The 3D coverage space depends on many parameters, such as inter-site distance (ISD), antenna type, antenna tilt, antenna height, etc. The cell association patterns may be different at different altitudes. The rays spread and propagate in the sky and create complex coverage patterns. If we change antenna tilt or select another cell as mainlobe indicator cell, the 3D coverage space will change to a different one. Therefore, we could flexibly select the pairs, each consisting of a mainlobe indicator cell and an aerial coverage cell, in the network to meet different deployment needs.

Figure 21:
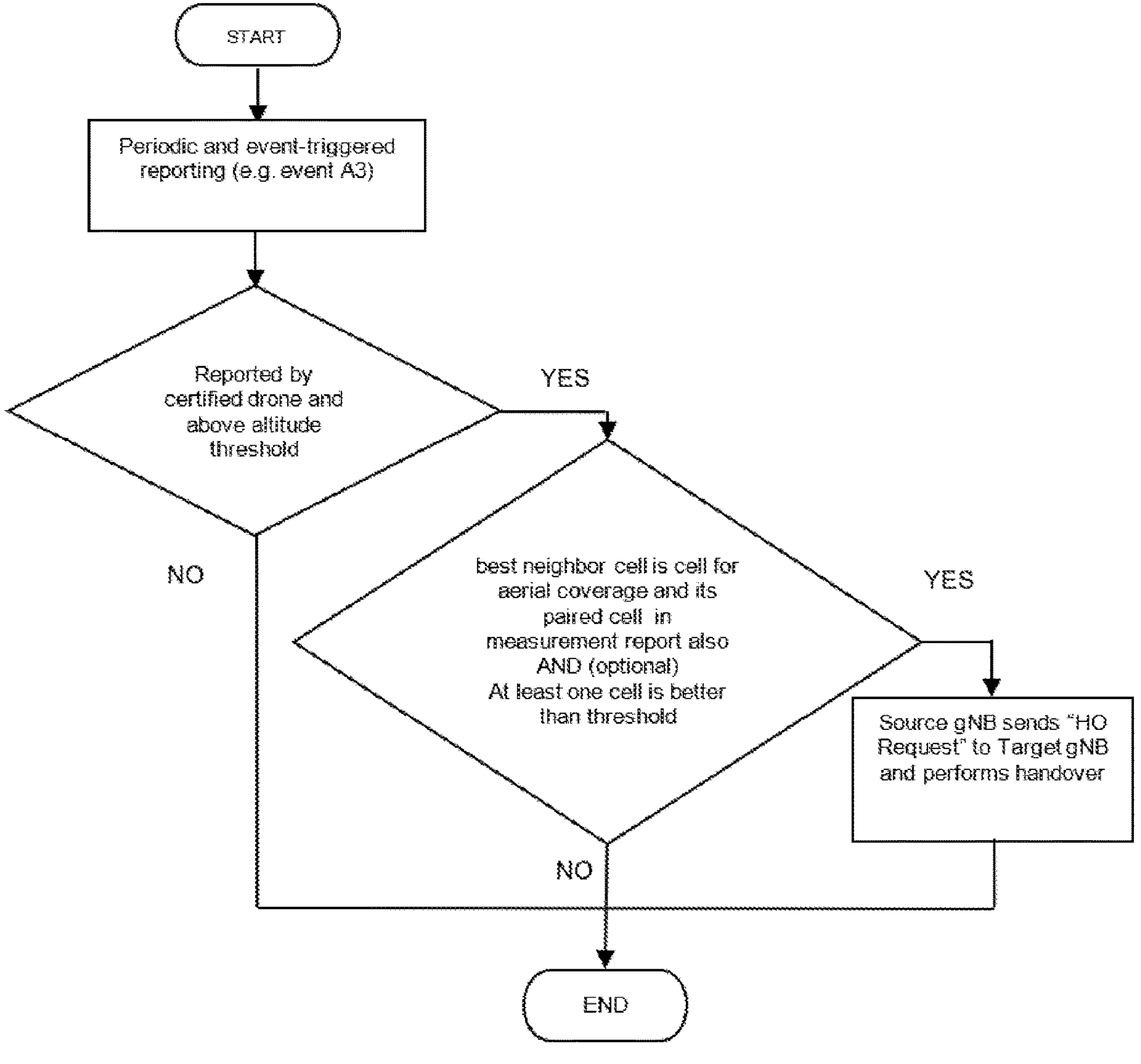
FIG. 21 provides an illustration of a flow chart for the above described handover decision procedure.

FIG. 21 provides an illustration of a flow chart for the above described handover decision procedure.

Further, an improved handover criterion may be also illustrated.

A report (such as measurement report) from a terminal device may be performed, and it may be periodic or event-triggered, such as by event A3.

The source NB may check whether the report is from a certified drone and whether it is above altitude threshold. For example, event H1 report added by 3GPP Release 15 may be utilized. In Release 15, there were enhancements to TS (technical specification) 36.331 (Section 5.5.4—Measurement report triggering) to address the issue of aerial UE interference to the base station (eNodeB). The enhancements included the addition of two reporting events—H1 (above) and H2 (below) UE height thresholds—to help the eNodeB to see the UAV and to deal with any potential interference.

In a typical handover procedure, UE reports measurement results to the network. Based on the reporting, the network may make a decision as to whether or not the device is to be handed over to a new cell.

In one embodiment, the network determines the pairs, each consisting of a mainlobe indicator cell and an aerial coverage cell, in the network to meet a deployment need.

In another embodiment, the network checks the measurement results reported by the UE.

If the best neighbor cell is an aerial coverage cell AND the measurement report also includes measurement results for the paired mainlobe indicator cell, the network makes a handover decision to hand the UE from a source cell to the target aerial coverage cell, triggering a handover request from the source cell to the target cell (which is provided by a target NB).

Otherwise, a handover request is not triggered.

In another embodiment, the network may include other factors in making the handover decision. As an example, the network may further check if at least one cell in the measurement report is above a threshold, besides checking if the best neighbor cell is an aerial coverage cell AND the measurement report also includes measurement results for the paired mainlobe indicator cell.

Figure 22:
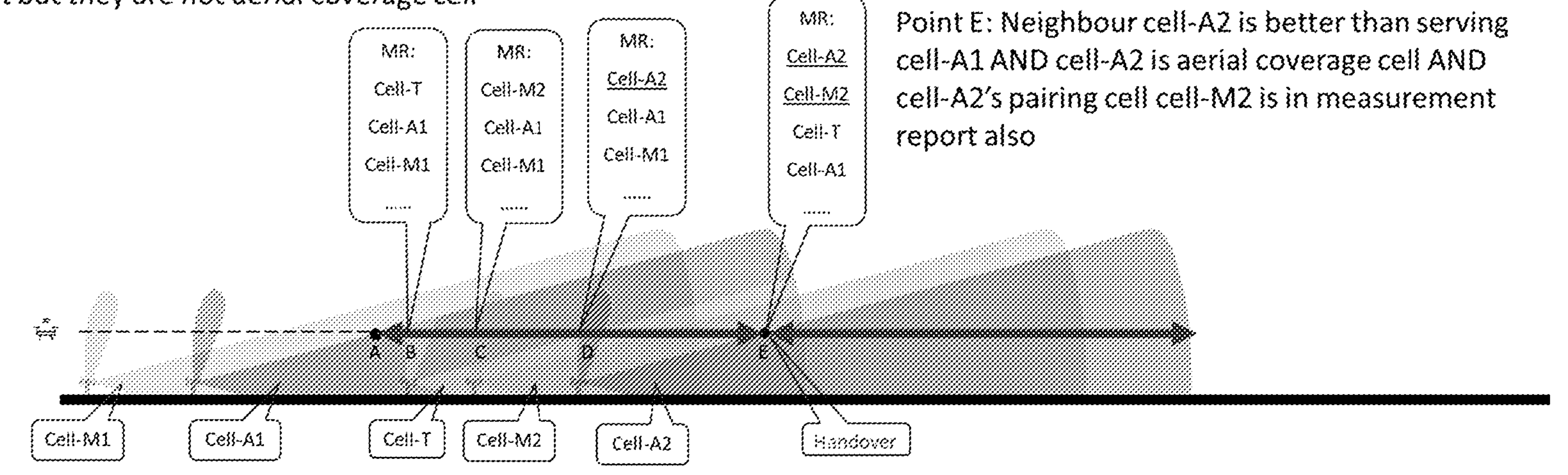
FIG. 22 provides an illustration of handover decisions made for an example flight path.

FIG. 22 provides an illustration of handover decisions made for an example flight path.

FIG. 22 provides an illustration of handover decisions made for an example flight path, based on the aforementioned embodiments. In this example, an aerial UE flies from left to right. The aerial UE is served by the left aerial coverage cell (Cell-A1) from point A. The UE reports better cells at point B, C and D based on the sidelobe signals. With the proposed scheme, these measurement reports will not trigger the network to make a handover decision, and thus all these sidelobes are ignored by the network (D is sidelobe of the right aerial coverage cell Cell-A2 and it is also ignored). At point E, the UE reports the right aerial coverage cell) as a better cell and its paired cell (the right mainlobe indicator cell) is also reported. In this case, a handover decision is made to handover the UE from the left aerial coverage cell to the right aerial coverage cell.

Specifically, at point B and C: drone reports better cells (cell-T, cell-M2) by measurement but they are not aerial coverage cell. At point D: neighbour cell-A2 is better than serving cell-A1 AND cell-A2 is aerial coverage cell but cell-A2's pairing cell cell-M2 is not in measurement. At point E: Neighbour cell-A2 is better than serving cell-A1 AND cell-A2 is aerial coverage cell AND cell-A2's pairing cell cell-M2 is in measurement report too.

In another embodiment, the network configures the UE with a measurement report setting, where the UE is instructed to measure only the aerial coverage cells and the mainlobe indicator cells. This can be achieved by only adding the aerial coverage cells and the mainlobe indicator cells to the list of cells to measure. Alternatively, the aerial coverage cells and the mainlobe indicator cells can be configured in the Whitelisted cells that are the only ones applicable in event evaluation or measurement reporting. As another alternative, the cells that are neither aerial coverage cells nor the mainlobe indicator cells can be configured in Blacklisted cells that are not applicable in event evaluation or measurement reporting.

In another embodiment, the network configures the UE with a list of aerial coverage cells and a list of mainlobe indicator cells. The UE measures both aerial coverage cells and mainlobe indicator cells. The UE performs event evaluations based on measurements of the aerial coverage cells. The UE reports measurement results for both aerial coverage cells and mainlobe indicator cells.

Further, some simulation results are provided to illustrate the proposed methods.

Figure 23A:
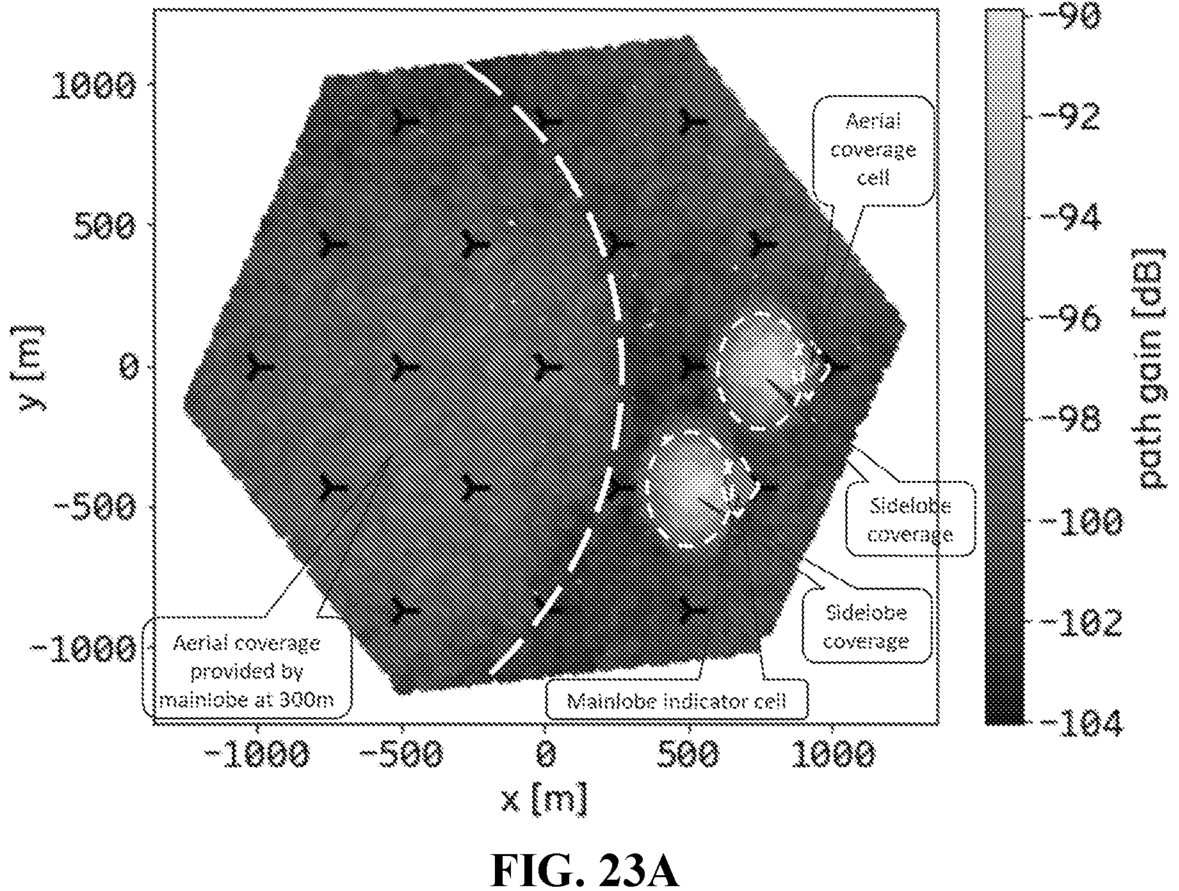
FIG. 23A, 23B illustrates a path gain map in a simulated area with a pair of mainlobe indicator cell and aerial coverage cell.
Figure 23B:
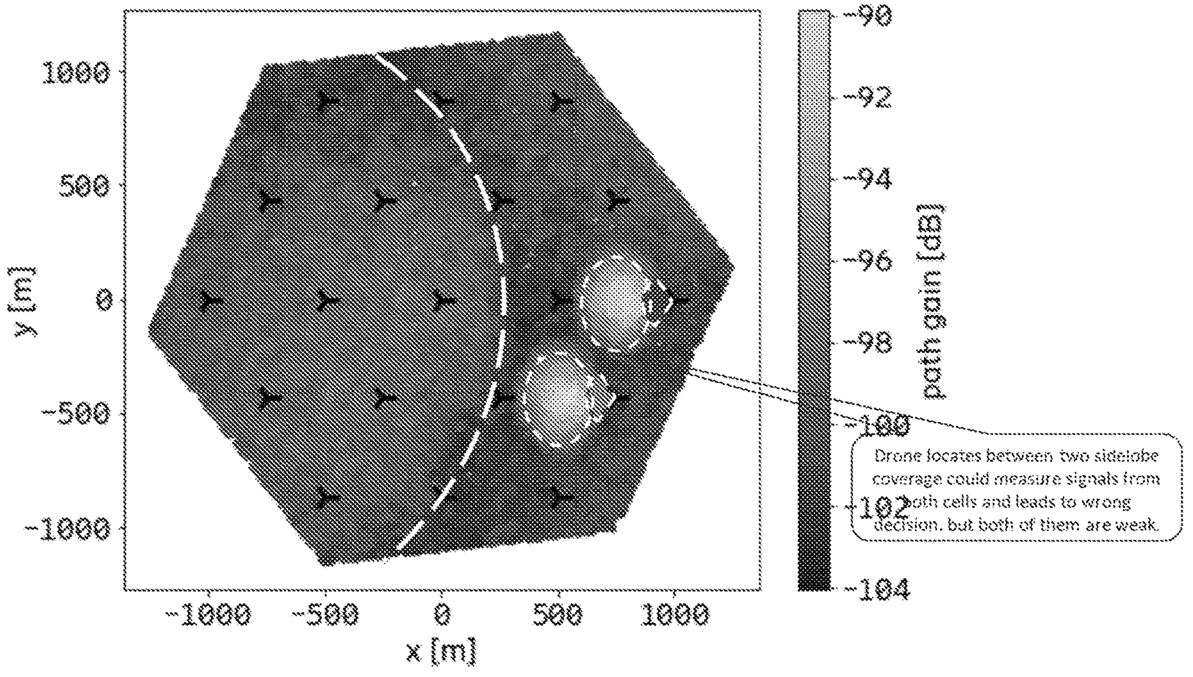

FIG. 23A, 23B illustrates a path gain map in a simulated area with a pair of mainlobe indicator cell and aerial coverage cell.

The path gain map may be simulated for 300 m height (for clarity of illustration, only 2 cells are enabled).

The mainlobe indicator cell should preferably be selected around the aerial coverage cell, for example the cell at down side in FIG. 23A. In this case, the cells in a pair have almost overlapped mainlobe coverage and non-overlapped sidelobe coverage.

FIG. 23B particularly shows an illustration of the role of the optional handover decision criterion (i.e., 'at least one cell is better than threshold' in FIG. 21).

Note the optional criterion 'at least one cell is better than threshold' as described in the flow chart in FIG. 21 can be used to avoid wrong decision between two sidelobe coverage areas. In FIG. 23B, it is possible that an aerial UE located between the mainlobe indicator cell and the aerial coverage cell may measure signals from both cells based on the side lobes. Without the optional criterion, the handover criteria may be fulfilled. But this location is not the desired coverage area for this cell pair. The optional handover criterion can help filter these wrong handovers.

Figure 24:
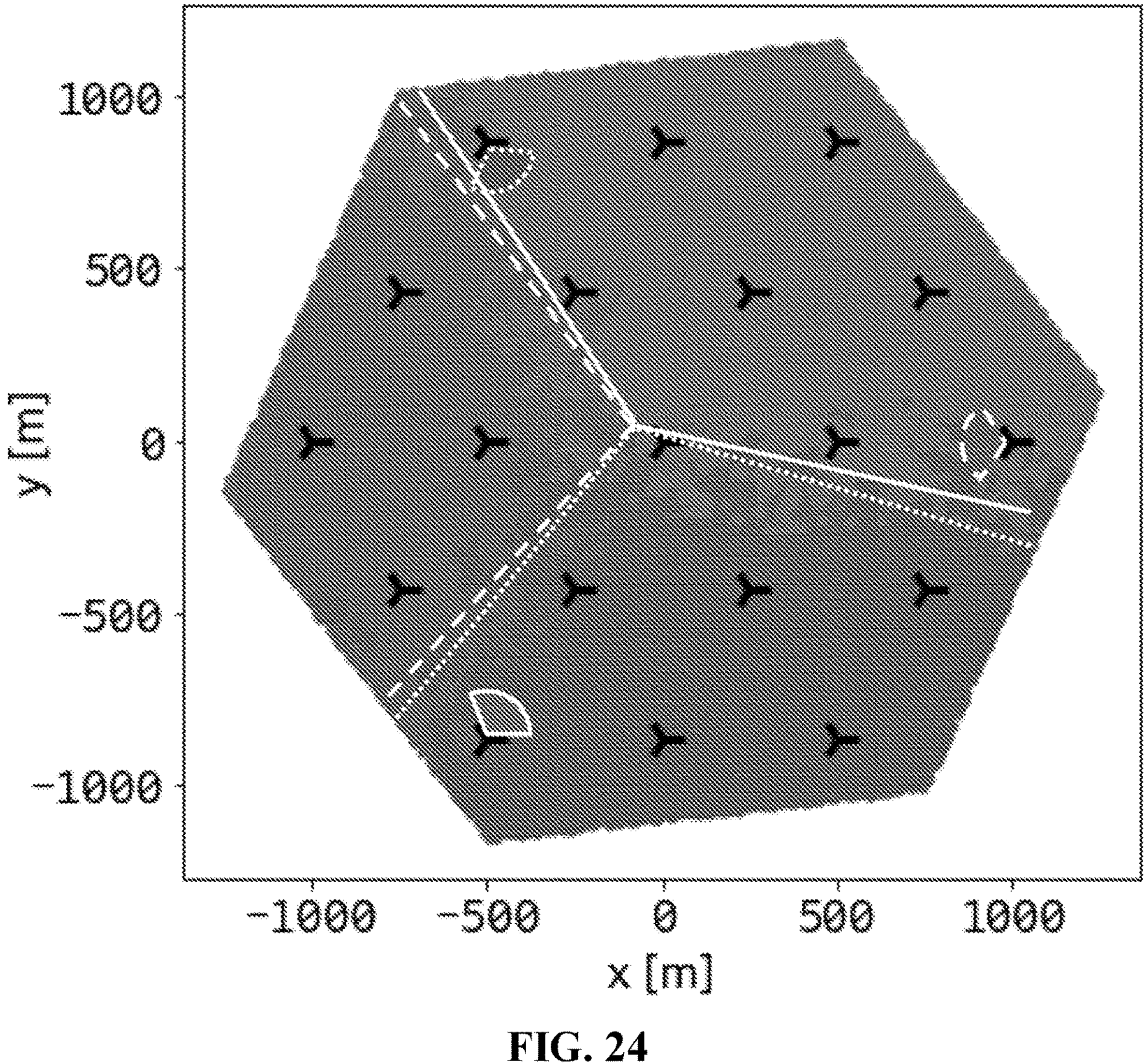
FIG. 24 illustrates three cells selected in the hexagon network as the aerial coverage cells.

FIG. 24 illustrates three cells selected in the hexagon network as the aerial coverage cells (their corresponding mainlobe indicator cells are not shown).

In FIG. 24, an illustration of the simulated aerial coverage provided by selecting three aerial coverage cells in a hexagonal network with 19 sites/57 cells.

Different coverage ranges of the different aerial coverage cells are labeled by different type of lines (such as solid line, point line, and dash line).

It can be seen that the main lobes of these three cells form continuous coverage in the network, while the side lobe coverage is ignored by the handover algorithm.

According to the present disclosure, some embodiments herein may provide at least one pair of cells in a communication system. The network node may determine whether a terminal device is in an overlapped coverage range of the serving cell and the assistant cell in one pair of cells, and use the serving cell to serve the terminal device. Since the overlapped coverage range of two cells is more unique than one cell in the communication system, the position of the terminal device may be more exactly determined by the network node, and the desired serving cell/beam may be used to serve the terminal device. Thus, the communication quality may be better ensured.

Further, an improved handover criterion may be also provided. That is, other interference cells not in a pair of cells may be automatically ignored, even when they have stronger power than the current serving cell. Therefore, the serving cell for the terminal device in certain positions will be much more predictable and configurable.

Additionally, the exemplary overall commutation system including the network node will be introduced as below.

Embodiments of the present disclosure provide a communication system including a host computer including: processing circuitry configured to provide user data; and a communication interface configured to forward the user data to a cellular network for transmission to a terminal device. The cellular network includes a network node above mentioned, and/or the terminal device is above mentioned.

In embodiments of the present disclosure, the system further includes the terminal device, wherein the terminal device is configured to communicate with the network node.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a network node. The transmission is from the terminal device to the network node. The network node is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 25:
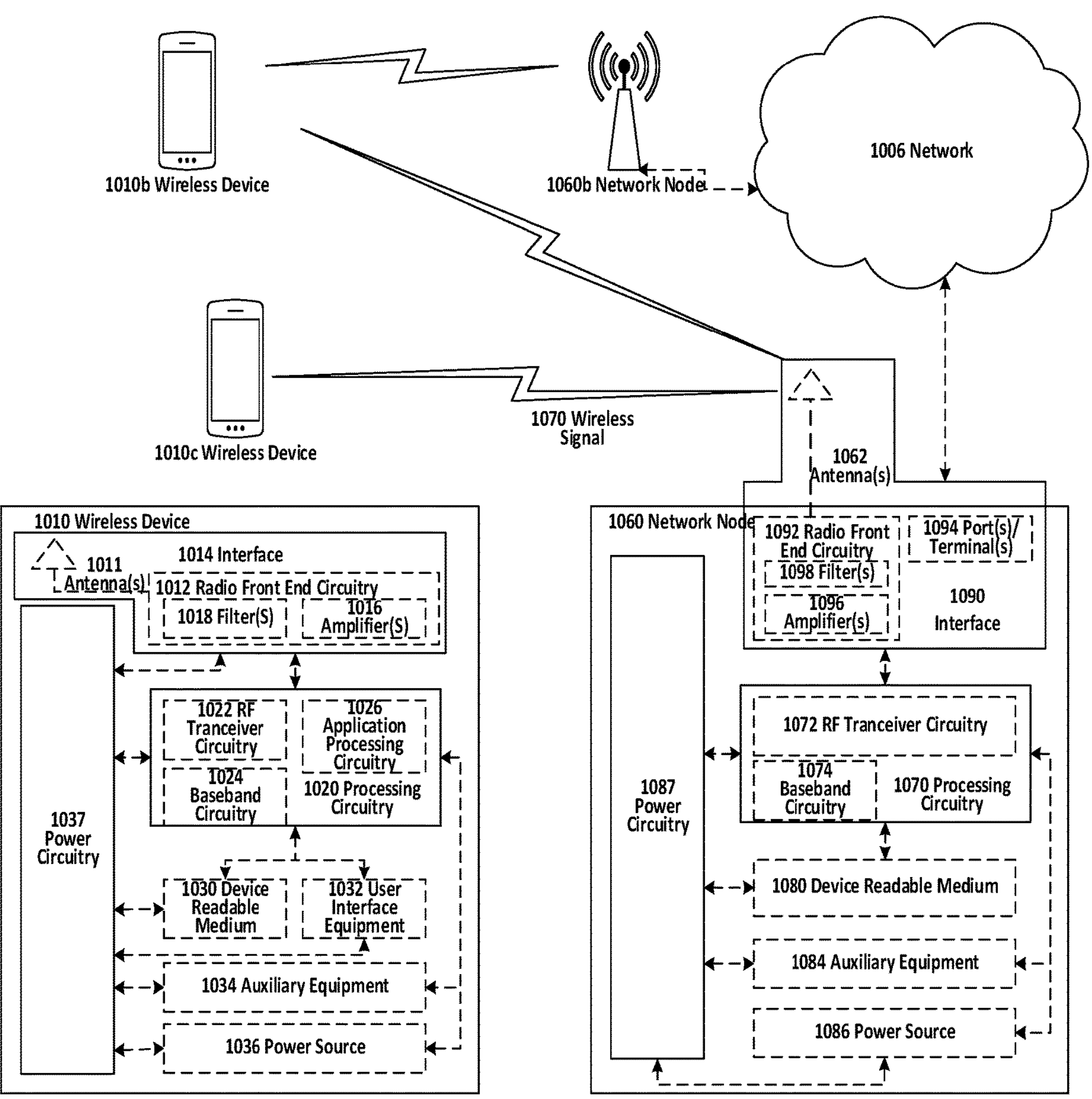
FIG. 25 is a schematic showing a wireless network in accordance with some embodiments.

FIG. 25 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 1006, network nodes 1060 and 1060*b* (e.g. corresponding to the network node), and WDs 1010, 1010*b*, and 1010*c* (e.g. corresponding to a terminal device). In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to transmit and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to transmit and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 25 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to transmit and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 26:
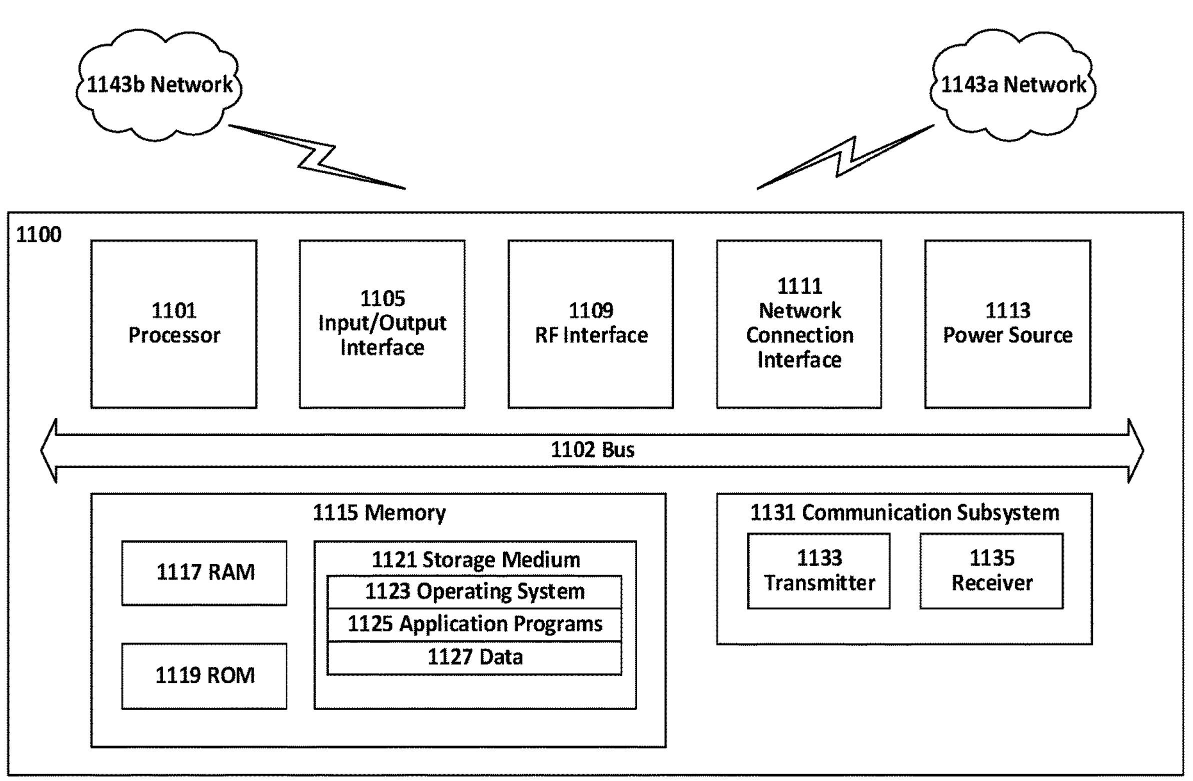
FIG. 26 is a schematic showing a user equipment in accordance with some embodiments.

FIG. 26 is a schematic showing a user equipment in accordance with some embodiments.

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 26, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 26 is a UE, the components discussed herein are equally applicable to a WD, and vice-versa.

In FIG. 26, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 26, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 27:
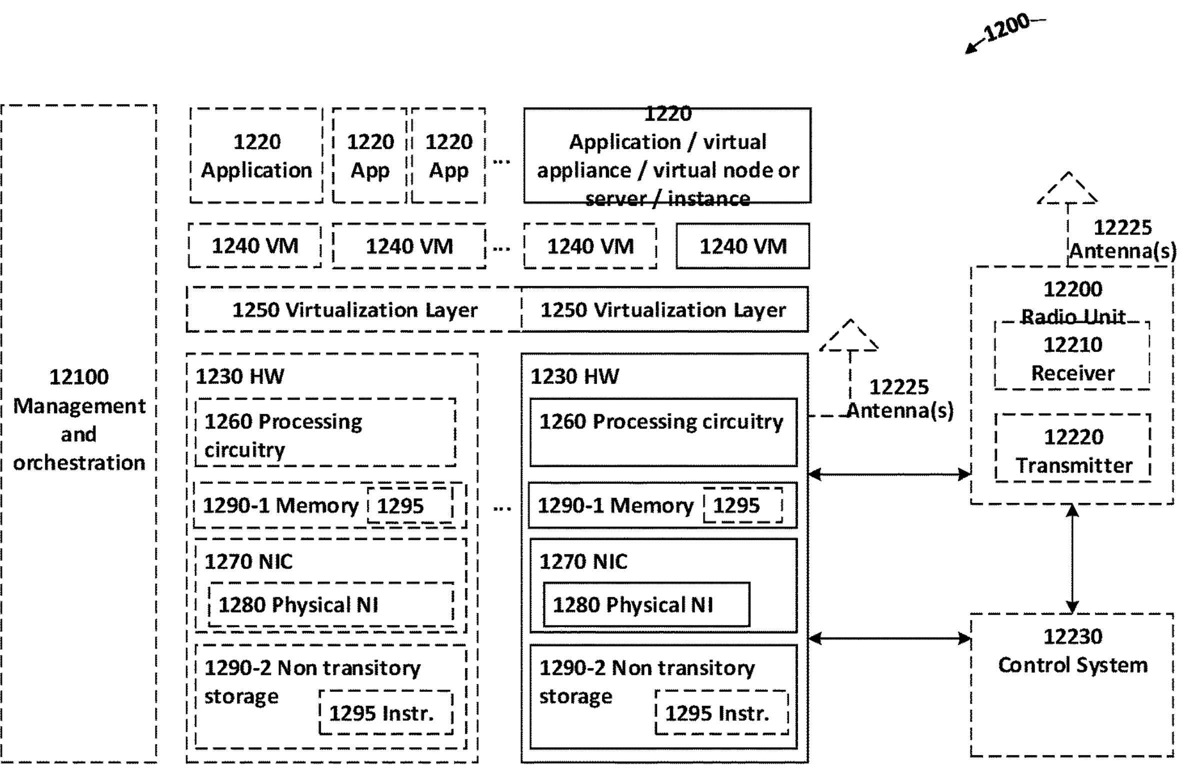
FIG. 27 is a schematic showing a virtualization environment in accordance with some embodiments.

FIG. 27 is a schematic showing a virtualization environment in accordance with some embodiments.

FIG. 27 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 27, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 27.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 28:
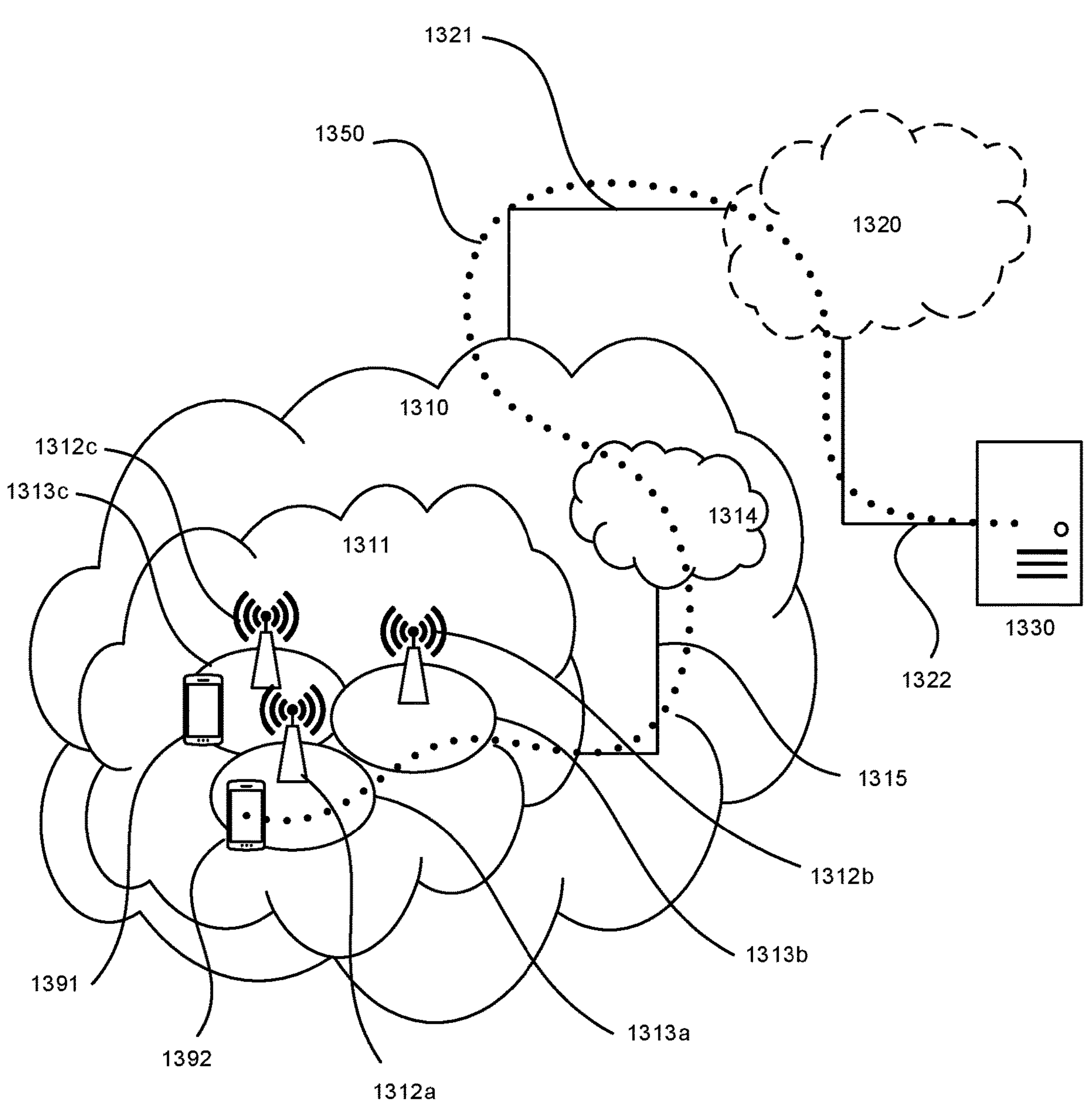
FIG. 28 is a schematic showing a telecommunication network connected via an intermediate network to a host computer in accordance with some embodiments.

FIG. 28 is a schematic showing a telecommunication network connected via an intermediate network to a host computer in accordance with some embodiments.

With reference to FIG. 28, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 28 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 29:
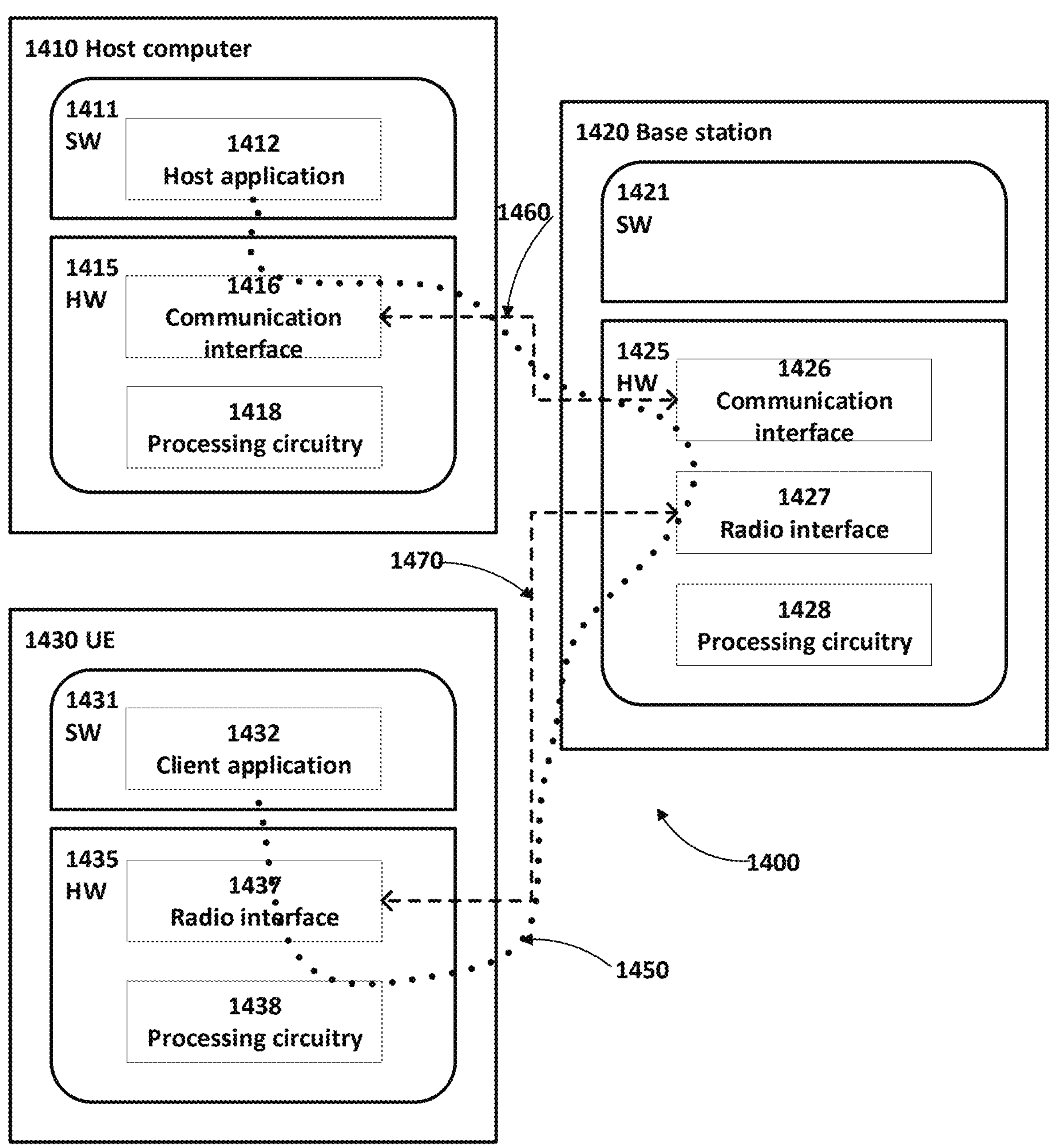
FIG. 29 is a schematic showing a host computer communicating via a base station with a user equipment over a partially wireless connection in accordance with some embodiments.

FIG. 29 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 29. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 29) served by base station 1420. Communication interface 1426 may be configured to facilitate connection 1460 to host computer 1410. Connection 1460 may be direct or it may pass through a core network (not shown in FIG. 29) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 29 may be similar or identical to host computer 1330, one of base stations 1312_a_, 1312_b_, 1312_c_ and one of UEs 1391, 1392 of FIG. 28, respectively. This is to say, the inner workings of these entities may be as shown in FIG. 29 and independently, the surrounding network topology may be that of FIG. 28.

In FIG. 29, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 30:
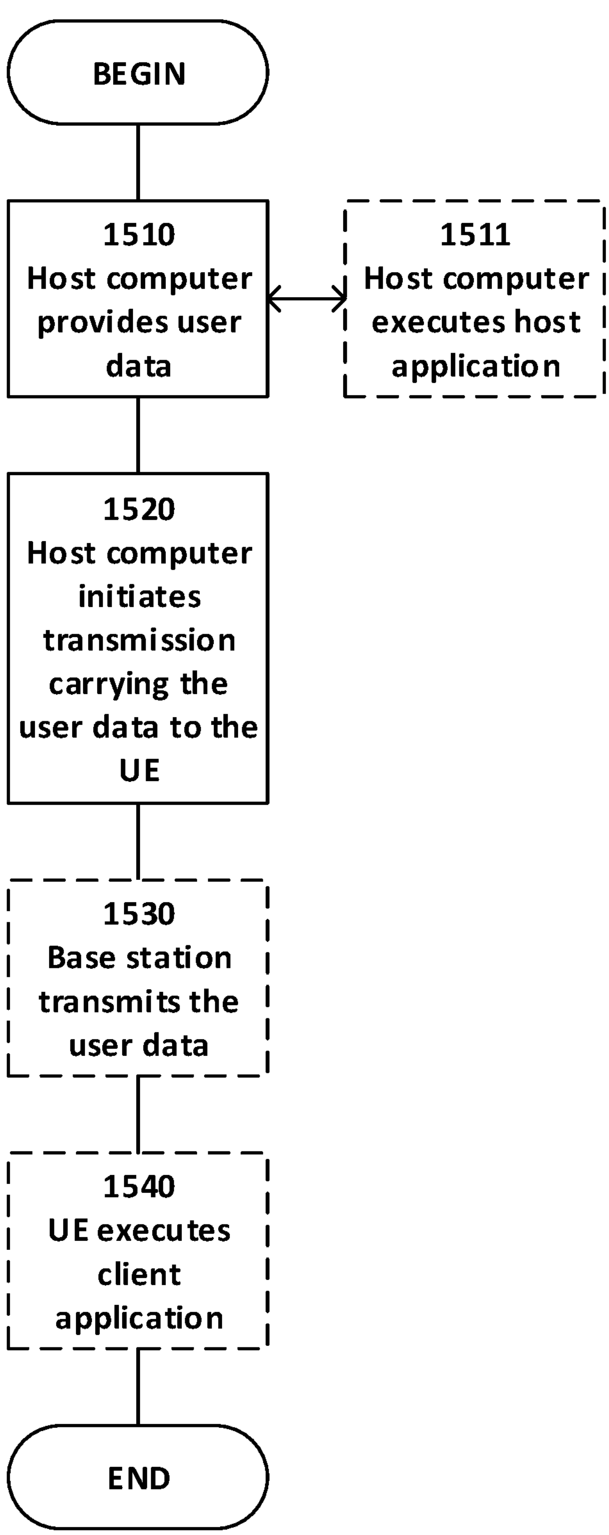
FIG. 30 is a flowchart illustrating a method implemented in a communication system, in accordance with one embodiment.

FIG. 30 is a flowchart illustrating a method implemented in a communication system, in accordance with one embodiment.

The communication system includes a host computer, a base station and a UE which may be those described with reference to FIGS. 28 and 29. For simplicity of the present disclosure, only drawing references to FIG. 30 will be included in this section. In step 1510, the host computer provides user data. In sub step 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 31:
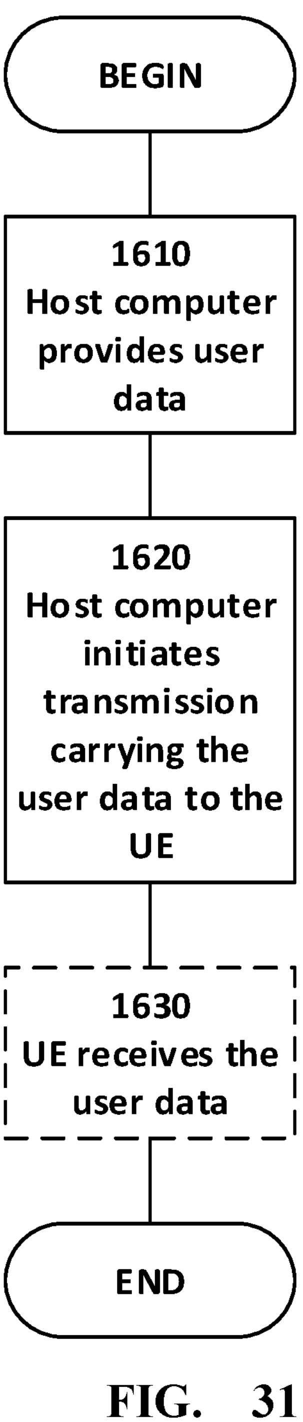
FIG. 31 is a flowchart illustrating a method implemented in a communication system, in accordance with one embodiment.

FIG. 31 is a flowchart illustrating a method implemented in a communication system, in accordance with one embodiment.

The communication system includes a host computer, a base station and a UE which may be those described with reference to FIGS. 28 and 29. For simplicity of the present disclosure, only drawing references to FIG. 31 will be included in this section. In step 1610 of the method, the host computer provides user data. In an optional sub step (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 32:
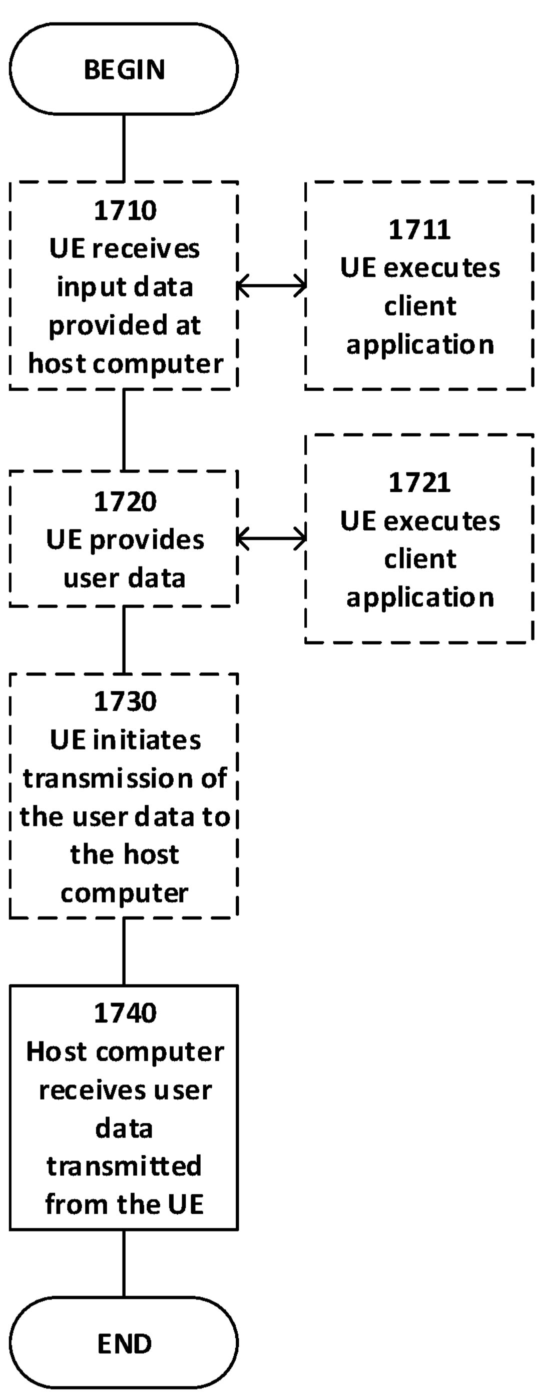
FIG. 32 is a flowchart illustrating a method implemented in a communication system, in accordance with one embodiment.

FIG. 32 is a flowchart illustrating a method implemented in a communication system, in accordance with one embodiment.

The communication system includes a host computer, a base station and a UE which may be those described with reference to FIGS. 28 and 29. For simplicity of the present disclosure, only drawing references to FIG. 32 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 33:
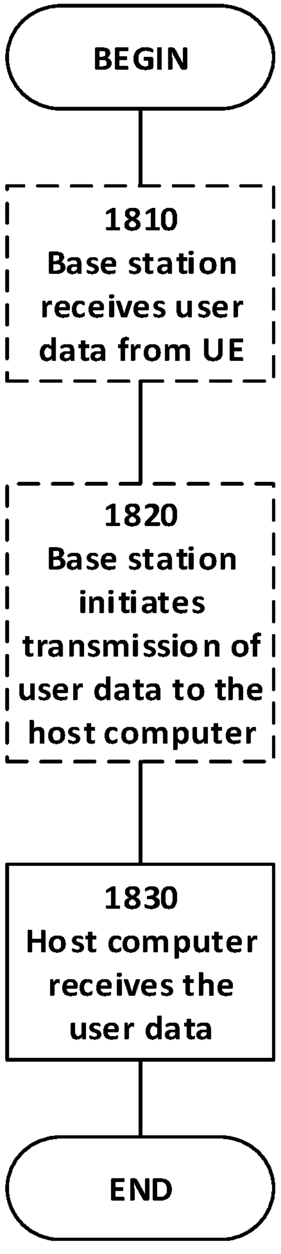
FIG. 33 is a flowchart illustrating a method implemented in a communication system, in accordance with one embodiment.

FIG. 33 is a flowchart illustrating a method implemented in a communication system, in accordance with one embodiment.

The communication system includes a host computer, a base station and a UE which may be those described with reference to FIGS. 28 and 29. For simplicity of the present disclosure, only drawing references to FIG. 33 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

| Abbreviation | Explanation |
|---|---|
| 3D | Three-dimension |
| 3GPP | The 3rd generation partnership project |
| 4G | The fourth generation wireless system |
| 5G | The fifth generation wireless system |
| BS | Base stations |
| IoT | Internet of things |
| ISD | Inter-site distance |
| KPI | Key performance indicator |
| LOS | Line of sight |
| RSRP | Reference signal received power |
| SINR | Signal-to-interference-plus-noise ratio |
| UAV | Unmanned aerial vehicles |
| UE | User equipment |

What is claimed is:

1. A method performed by a network node, the method comprising:

receiving a measurement report from a terminal device;

making a decision as to whether or not to hand the terminal device over from a source cell to a target cell according to handover criteria, wherein the handover criteria comprises whether or not the measurement report includes measurement results for both the target cell and an assistant cell that is paired with the target cell, wherein according to the handover criteria, if the measurement report includes measurement results for the target cell but not for the assistant cell, the decision is to not hand the terminal device over to the target cell; and instructing, or refraining from instructing, the terminal device to hand over from the source cell to the target cell according to the decision.

2. The method of claim 1, further comprising determining the handover criteria based on one or more factors, wherein the one or more factors include one or more of:

a type of the terminal device from which the measurement report is received;

an altitude of the terminal device from which the measurement report is received; or whether or not the target cell is an aerial coverage cell.

3. The method of claim 2, wherein determining the handover criteria comprises, based on the type of the terminal device being an aircraft and/or the altitude of the terminal device exceeding a threshold and/or the target cell being an aerial coverage cell, determining that the handover criteria is to comprise whether or not the measurement report includes measurement results for both the target cell and the assistant cell.

4. The method of claim 1, wherein the measurement report includes measurement results for the target cell but not for the assistant cell, wherein the measurement results for the target cell indicate that the target cell has a signal strength that is stronger than any other neighbor cell whose measurement results are included in the measurement report, wherein the decision is to not hand the terminal device over to the target cell, despite the target cell having a signal strength that is stronger than any other neighbor cell whose measurement results are included in the measurement report, because the measurement report does not include measurement results for the assistant cell, and wherein said instructing or refraining from instructing comprises refraining from instructing the terminal device to hand over from the source cell to the target cell according to the decision.

5. The method of claim 1, wherein the measurement report includes measurement results for both the target cell and for the assistant cell, wherein the decision is to hand the terminal device over to the target cell, and wherein said instructing or refraining from instructing comprises instructing the terminal device to hand over from the source cell to the target cell according to the decision.

6. The method of claim 1, wherein the terminal device is an aircraft, and wherein the handover criteria further includes whether or not the target cell is an aerial coverage cell.

7. The method of claim 1, wherein a boresight direction of an antenna for the target cell and a boresight direction of an antenna for the assistant cell are the same.

8. The method of claim 1, wherein the assistant cell is a mainlobe indicator cell paired with the target cell, wherein inclusion of measurement results for the assistant cell in the measurement report indicates that the terminal device is in coverage of a mainlobe of an antenna for the target cell and exclusion of measurement results for the assistant cell in the measurement report indicates that the terminal device is out of coverage of the mainlobe of the antenna for the target cell.

9. A method performed by a communication management node for a communication network, the method comprising:
- generating a configuration of a pairing between a first cell and a second cell, wherein one or more of:
  - the second cell is a mainlobe indicator cell for the first cell, wherein inclusion of measurement results for the second cell in a measurement report from a terminal device indicates that the terminal device is in coverage of a mainlobe of an antenna for the first cell;
  - a boresight direction of an antenna for the first cell and a boresight direction of an antenna for the second cell are the same; or
  - inclusion of measurement results for the second cell in a measurement report from a terminal device is a prerequisite for a terminal device to be handed over to the first cell; and
- transmitting the configuration to a network node of the communication network.

10. The method of claim 9, wherein the first cell is an aerial coverage cell.

11. A network node for a communication network, the network node comprising:
- a processor; and
- a memory containing instructions executable by the processor whereby the network node is configured to:
  - receive a measurement report from a terminal device;
  - make a decision as to whether or not to hand the terminal device over from a source cell to a target cell according to handover criteria, wherein the handover criteria comprises whether or not the measurement report includes measurement results for both the target cell and an assistant cell that is paired with the target cell, wherein according to the handover criteria, if the measurement report includes measurement results for the target cell but not for the assistant cell, the decision is to not hand the terminal device over to the target cell; and
  - instruct, or refrain from instructing, the terminal device to hand over from the source cell to the target cell according to the decision.

12. The network node of claim 11, the memory containing instructions executable by the processor whereby the network node is further configured to determine the handover criteria based on one or more factors, wherein the one or more factors include one or more of:
- a type of the terminal device from which the measurement report is received;
- an altitude of the terminal device from which the measurement report is received; or
- whether or not the target cell is an aerial coverage cell.

13. The network node of claim 12, the memory containing instructions executable by the processor whereby the network node is configured to, based on the type of the terminal device being an aircraft and/or the altitude of the terminal device exceeding a threshold and/or the target cell being an aerial coverage cell, determine that the handover criteria is to comprise whether or not the measurement report includes measurement results for both the target cell and the assistant cell.

14. The network node of claim 11, wherein the measurement report includes measurement results for the target cell but not for the assistant cell, wherein the measurement results for the target cell indicate that the target cell has a signal strength that is stronger than any other neighbor cell whose measurement results are included in the measurement report, wherein the decision is to not hand the terminal device over to the target cell, despite the target cell having a signal strength that is stronger than any other neighbor cell whose measurement results are included in the measurement report, because the measurement report does not include measurement results for the assistant cell, and wherein the memory contains instructions executable by the processor whereby the network node is configured to refrain from instructing the terminal device to hand over from the source cell to the target cell according to the decision.

15. The network node of claim 11, wherein the measurement report includes measurement results for both the target cell and for the assistant cell, wherein the decision is to hand the terminal device over to the target cell, and wherein the memory contains instructions executable by the processor whereby the network node is configured to instruct the terminal device to hand over from the source cell to the target cell according to the decision.

16. The network node of claim 11, wherein the terminal device is an aircraft, and wherein the handover criteria further includes whether or not the target cell is an aerial coverage cell.

17. The network node of claim 11, wherein a boresight direction of an antenna for the target cell and a boresight direction of an antenna for the assistant cell are the same.

18. The network node of claim 11, wherein the assistant cell is a mainlobe indicator cell paired with the target cell, wherein inclusion of measurement results for the assistant cell in the measurement report indicates that the terminal device is in coverage of a mainlobe of an antenna for the target cell and exclusion of measurement results for the assistant cell in the measurement report indicates that the terminal device is out of coverage of the mainlobe of the antenna for the target cell.

19. A communication management node for a communication network, the communication management node comprising:
- a processor; and
- a memory containing instructions executable by the processor whereby the communication management node is configured to:
  - generate a configuration of a pairing between a first cell and a second cell, wherein one or more of:
    - the second cell is a mainlobe indicator cell for the first cell, wherein inclusion of measurement results for the second cell in a measurement report from a terminal device indicates that the terminal device is in coverage of a mainlobe of an antenna for the first cell;

a boresight direction of an antenna for the first cell and a boresight direction of an antenna for the second cell are the same; or inclusion of measurement results for the second cell in a measurement report from a terminal device is a prerequisite for a terminal device to be handed over to the first cell; and transmit the configuration to a network node of the communication network.

20. The communication management node of claim 19, wherein the first cell is an aerial coverage cell.

* * * * *